Figure 1:
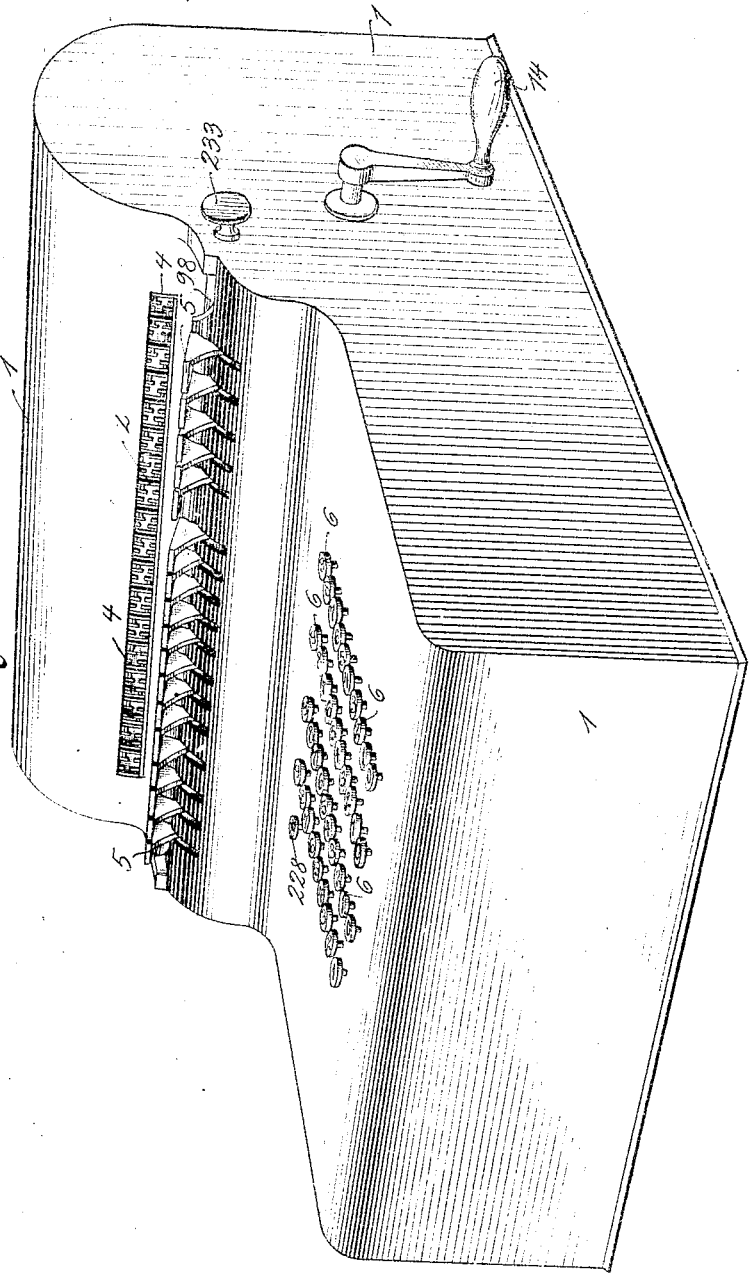

A. D. KENYON.
COMPUTING MACHINE.
APPLICATION FILED JULY 11, 1903. RENEWED APR. 29, 1912.

1,118,135.

Patented Nov. 24, 1914.
33 SHEETS—SHEET 3.

A. D. KENYON.
COMPUTING MACHINE.
APPLICATION FILED JULY 11, 1903. RENEWED APR. 29, 1912.
1,118,135.
Patented Nov. 24, 1914.
33 SHEETS—SHEET 10.
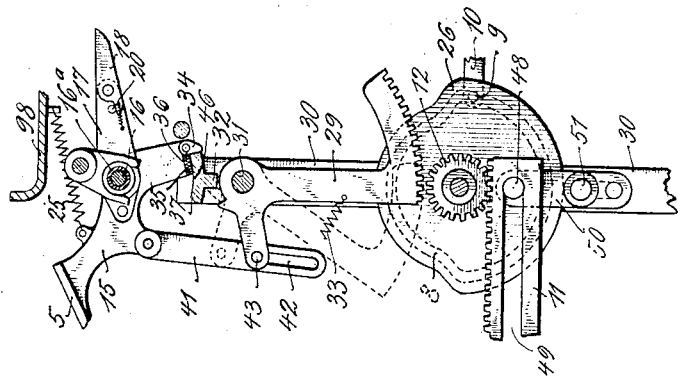
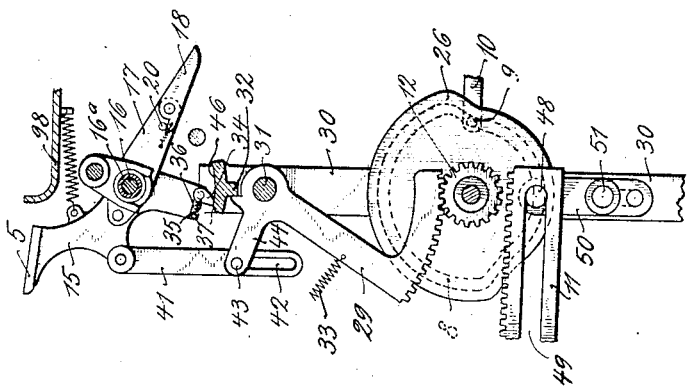
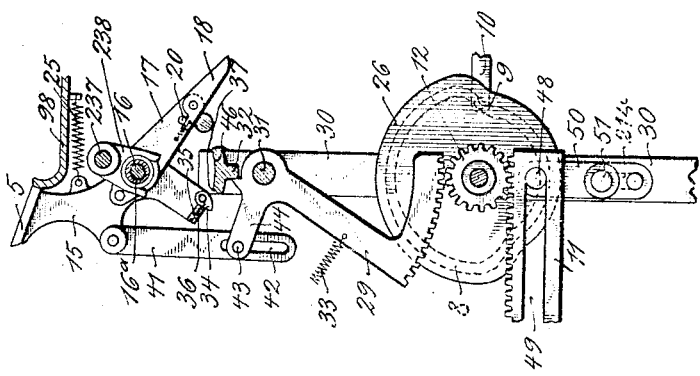

A. D. KENYON.
COMPUTING MACHINE.
APPLICATION FILED JULY 11, 1903. RENEWED APR. 29, 1912.
1,118,135.
Patented Nov. 24, 1914.
33 SHEETS—SHEET 11.
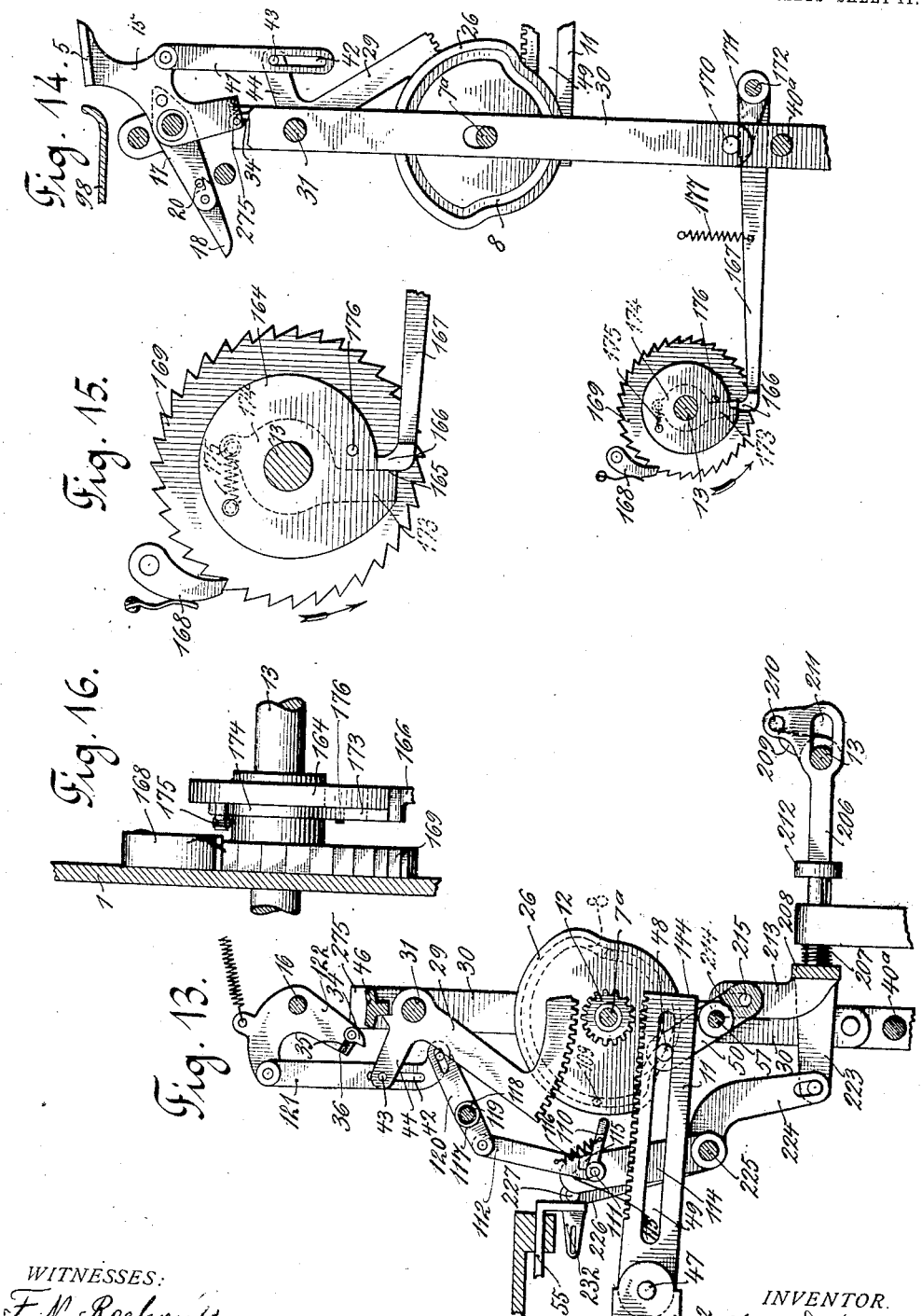
WITNESSES:
F. N. Roehrich
John O. Gempler
INVENTOR.
Alan D. Kenyon
BY Kenyon & Kenyon
his ATTORNEYS.

A. D. KENYON.
COMPUTING MACHINE.
APPLICATION FILED JULY 11, 1903. RENEWED APR. 29, 1912.
1,118,135.
Patented Nov. 24, 1914.
33 SHEETS—SHEET 12.
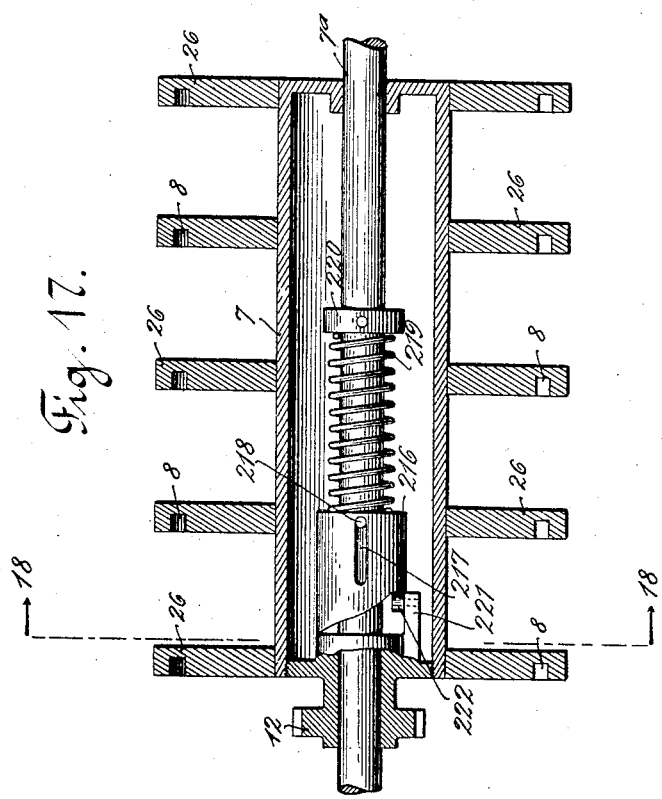
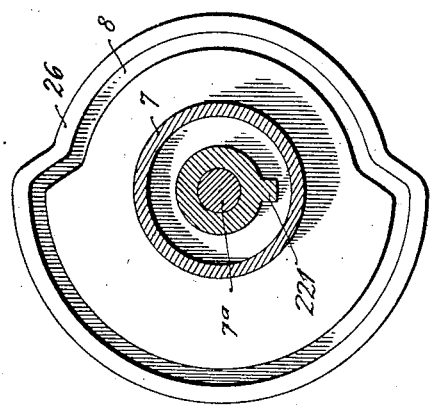
WITNESSES:
F. N. Roehrich
John O. Gempler
INVENTOR.
Alan D. Kenyon
BY Kenyon & Kenyon
his ATTORNEYS.

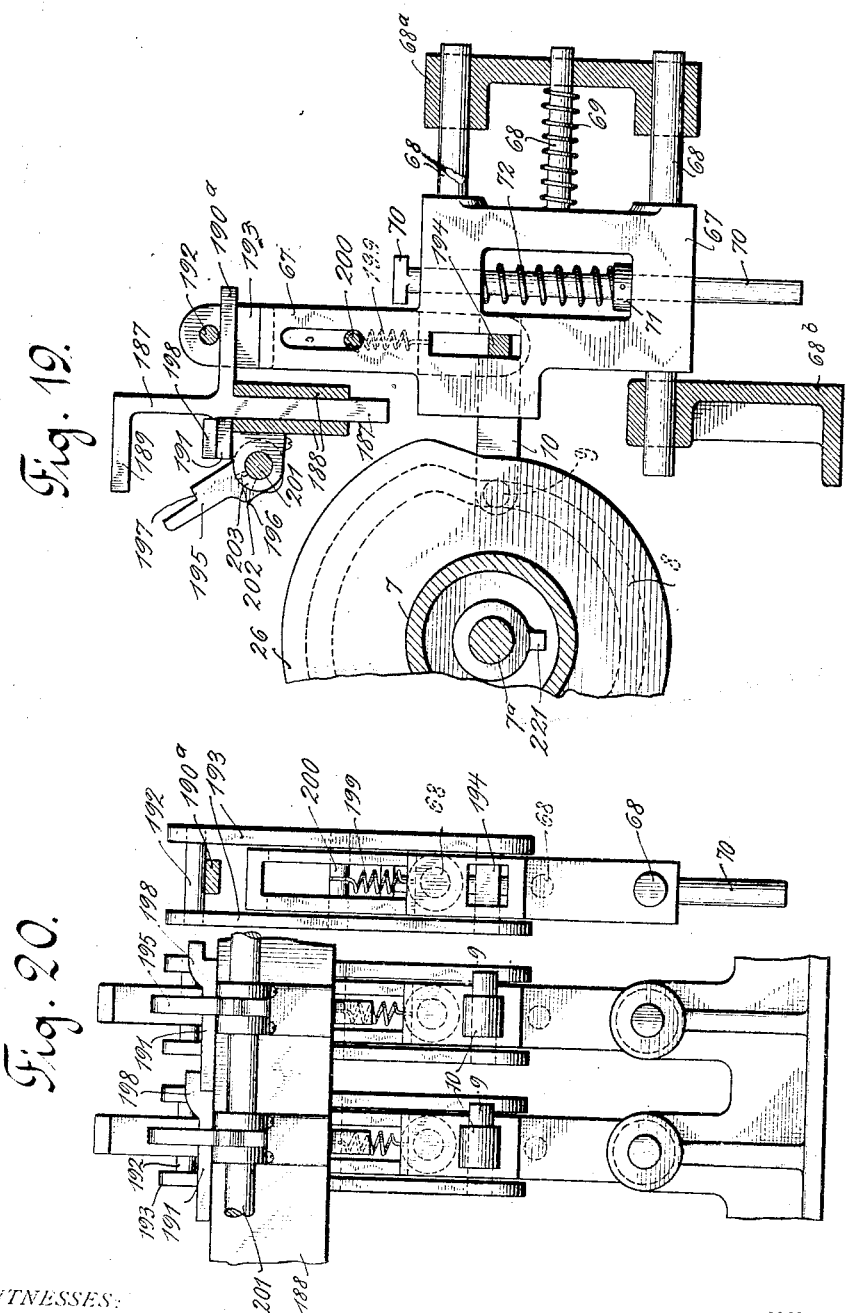

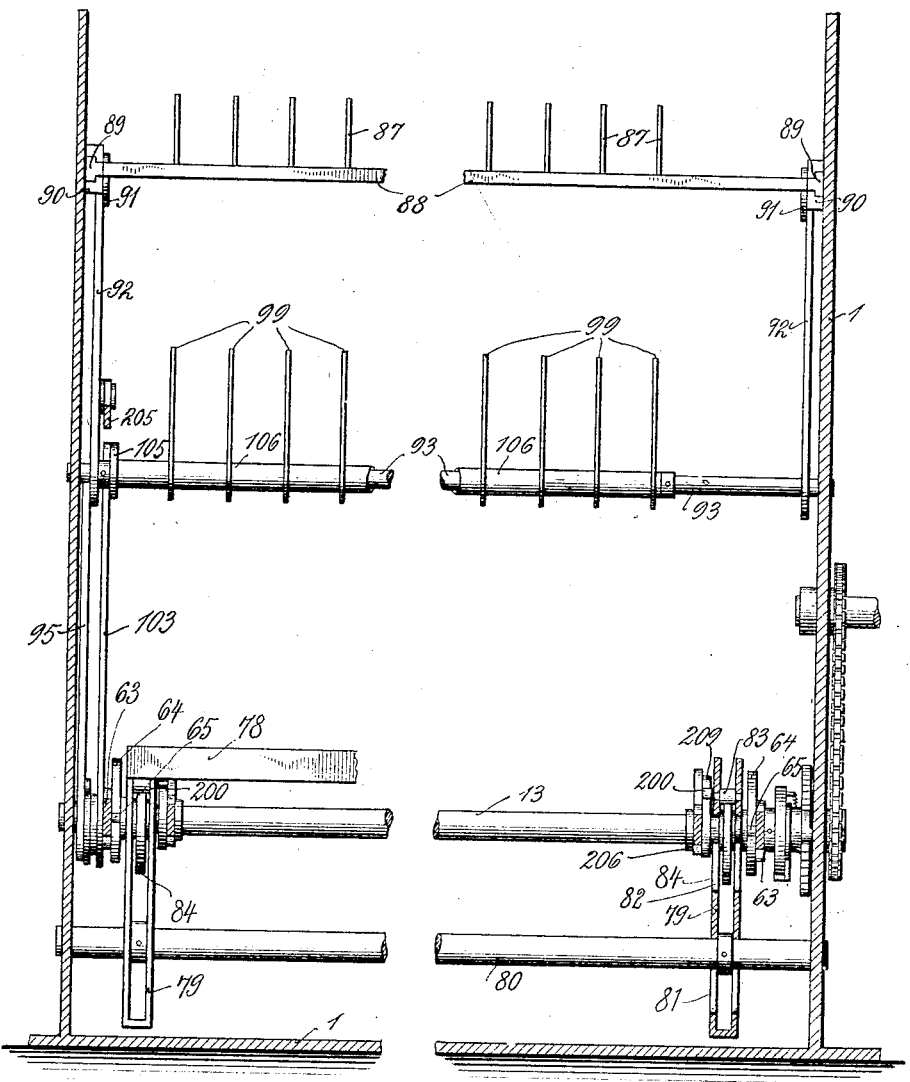

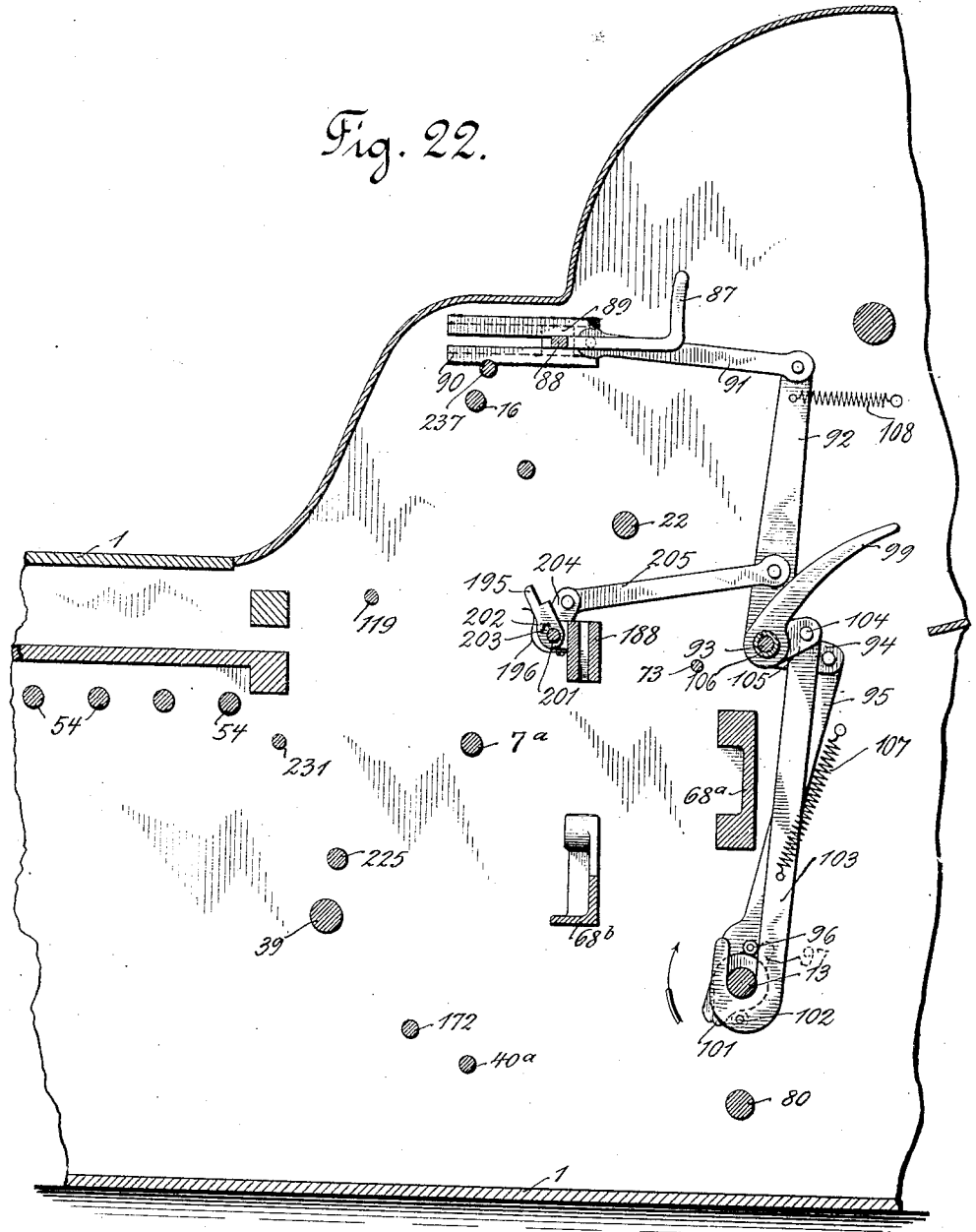

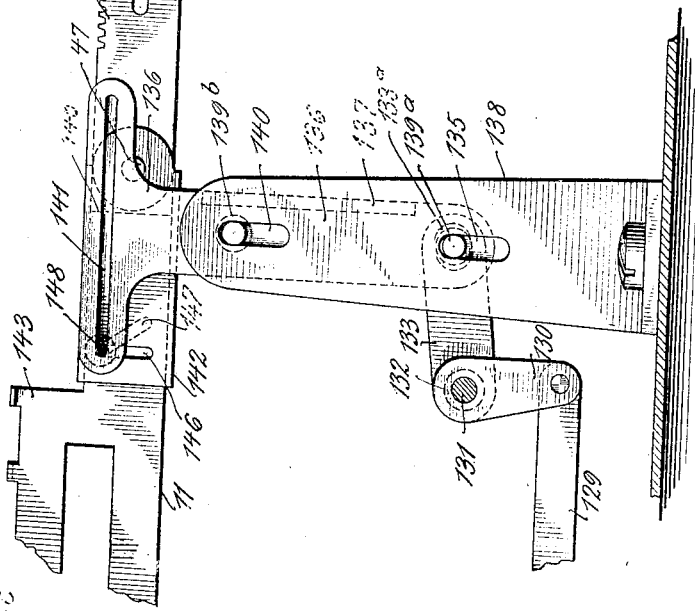

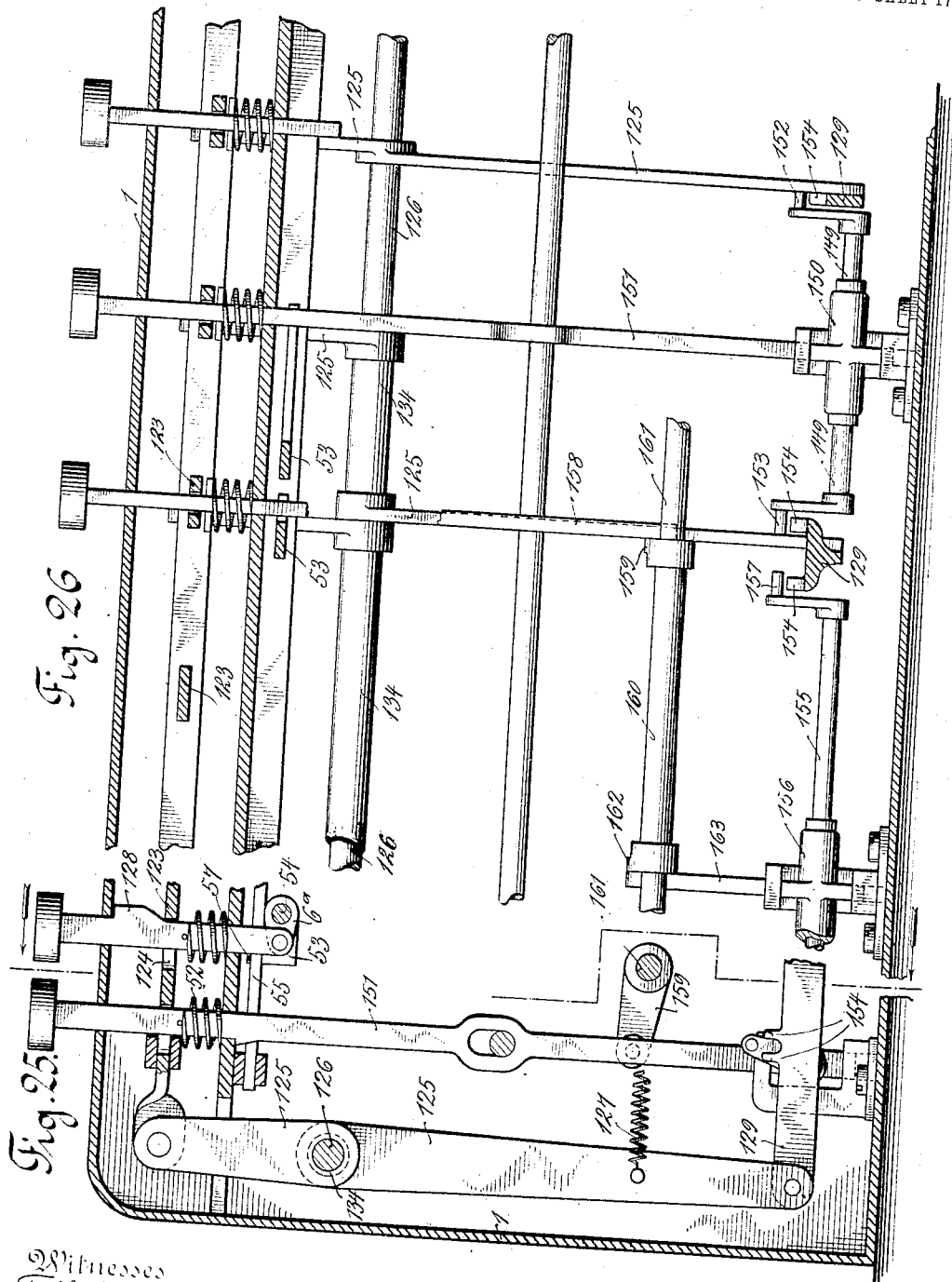

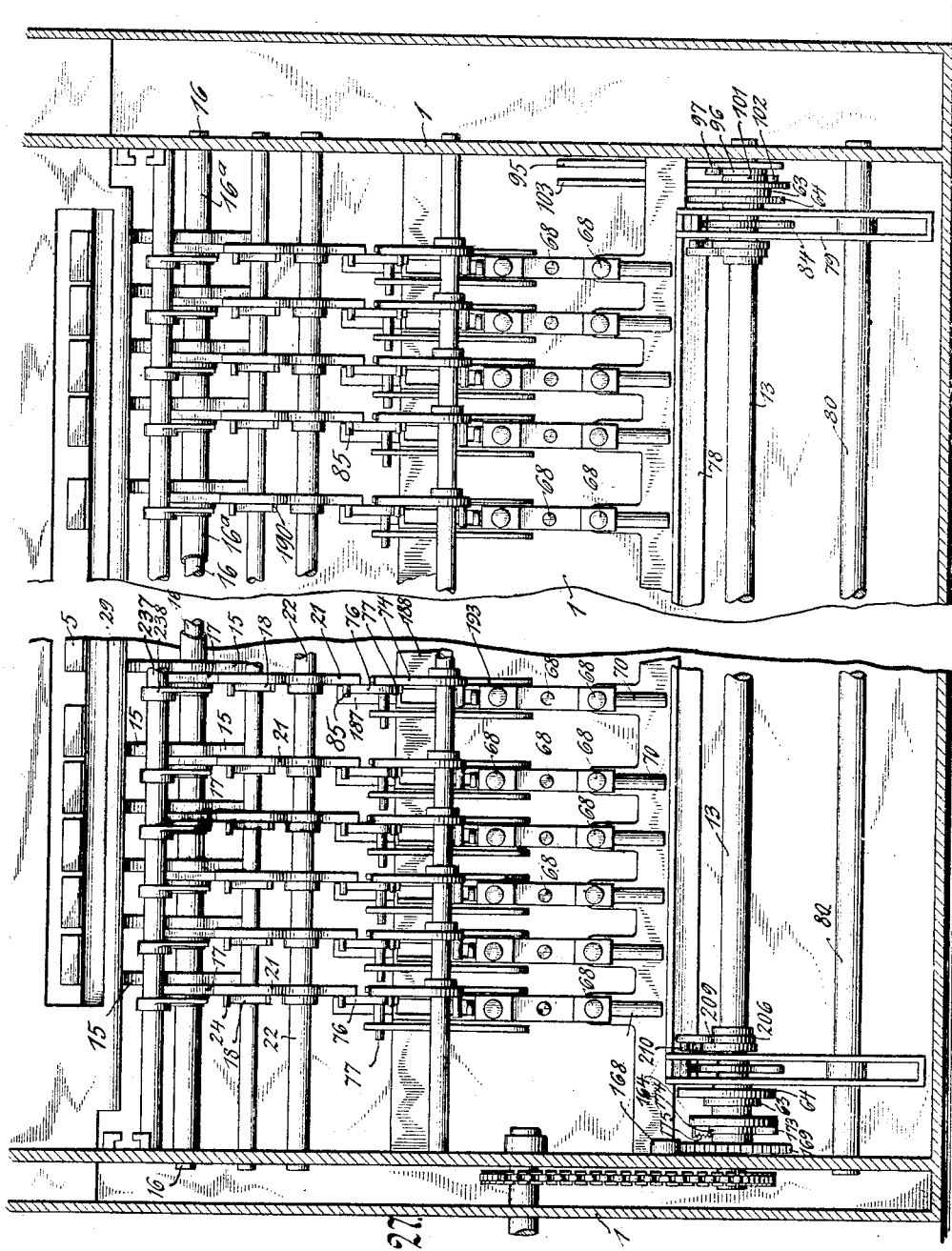

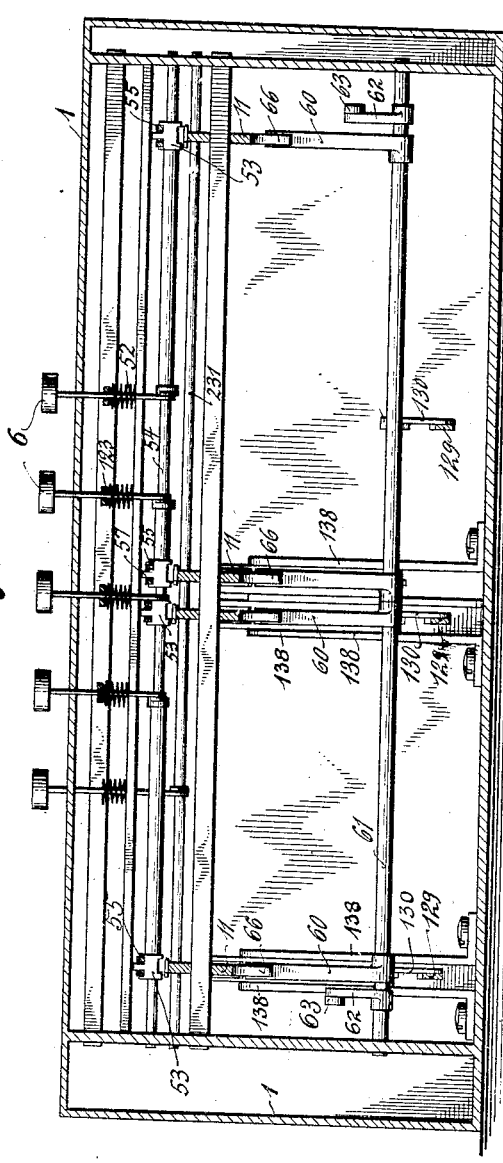

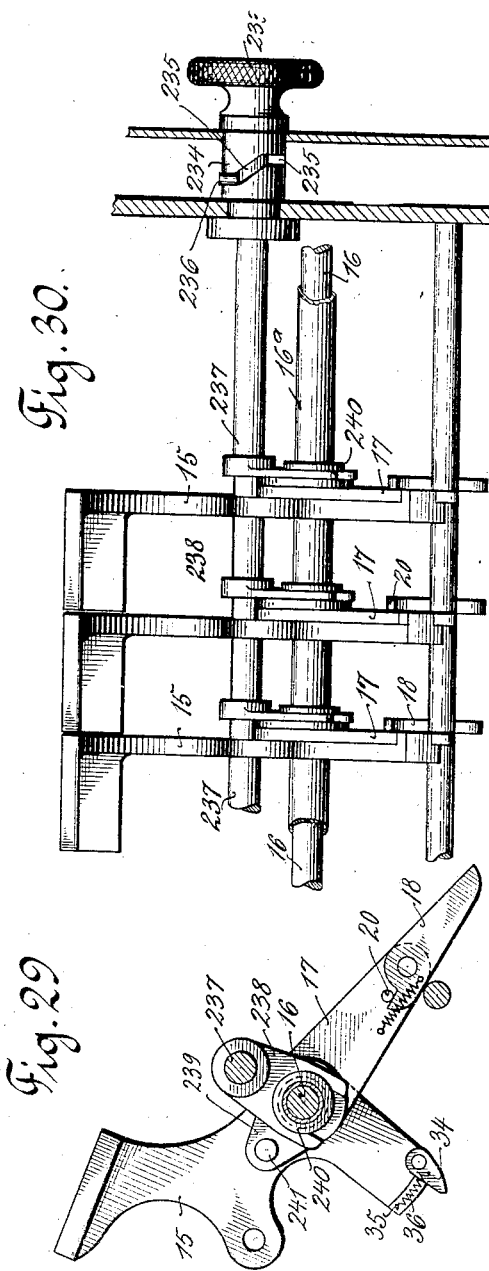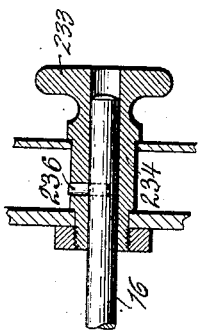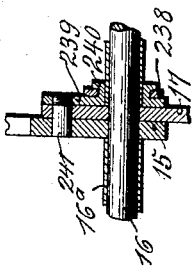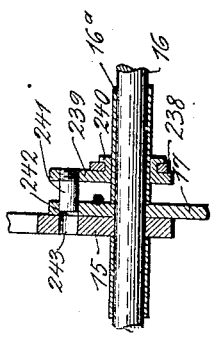

A. D. KENYON.
COMPUTING MACHINE.
APPLICATION FILED JULY 11, 1903. RENEWED APR. 29, 1912.
1,118,135.  Patented Nov. 24, 1914.
33 SHEETS—SHEET 21.
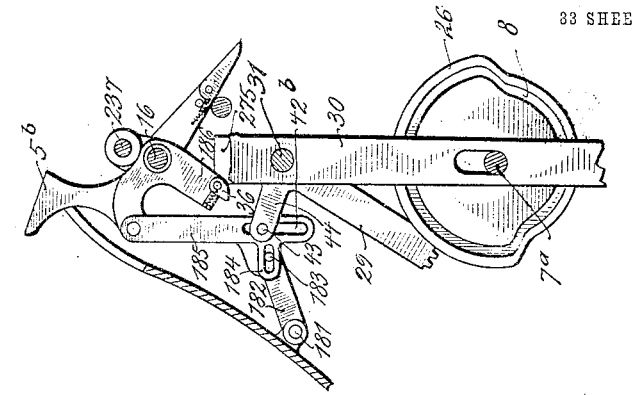
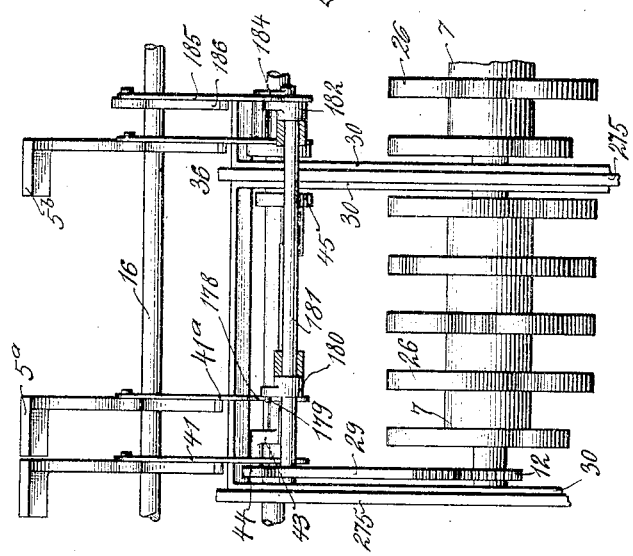
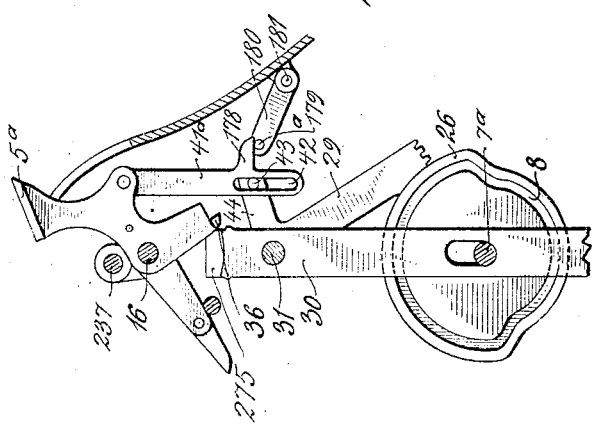
Witnesses
F. N. Koehrich
John O. Gempler
Inventor
Alan D. Kenyon
By his Attorneys Kenyon & Kenyon A. D. KENYON.
COMPUTING MACHINE.
APPLICATION FILED JULY 11, 1903. RENEWED APR. 29, 1912.

1,118,135.
Patented Nov. 24, 1914.
33 SHEETS—SHEET 22.

Witnesses
F. N. Roehrich
John O. Gempler

Inventor
Alan D. Kenyon
By his Attorneys Kenyon & Kenyon.

A. D. KENYON.
COMPUTING MACHINE.
APPLICATION FILED JULY 11, 1903. RENEWED APR. 29, 1912.

1,118,135.

Patented Nov. 24, 1914.
33 SHEETS—SHEET 23.

Witnesses
F. N. Roehrich
John O. Gempler

Inventor
Alan D. Kenyon
By his Attorneys Kenyon & Kenyon

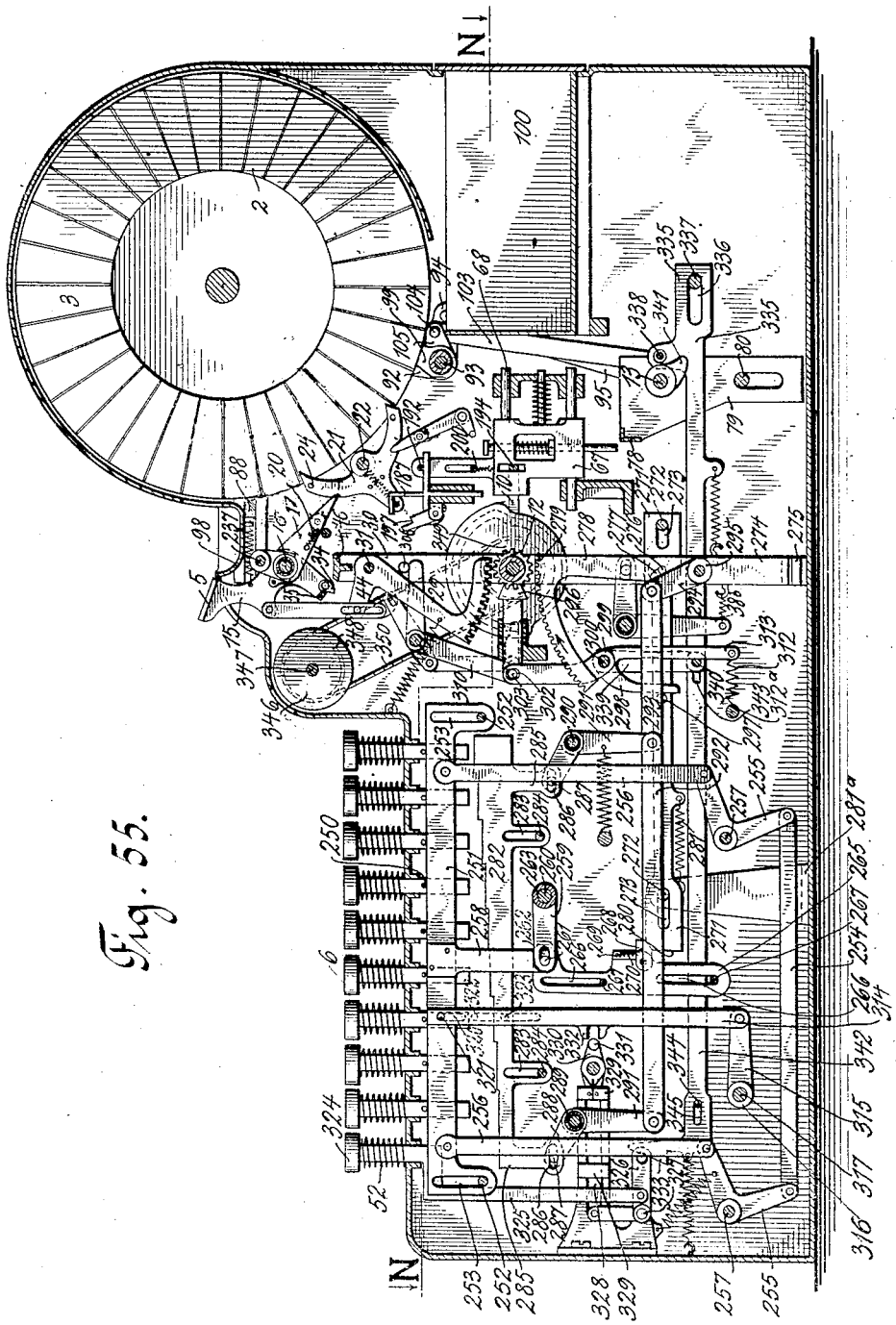

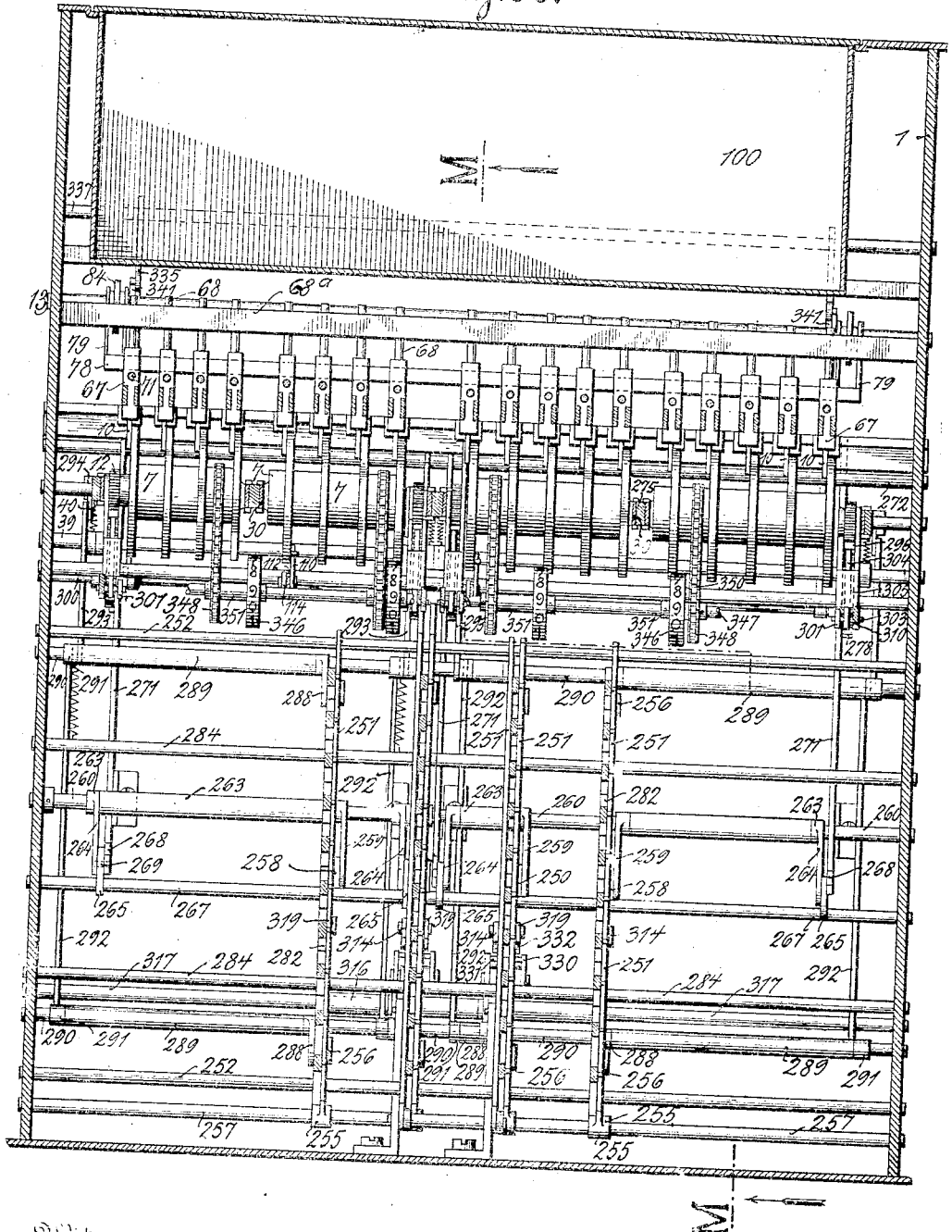

A. D. KENYON.
COMPUTING MACHINE.
APPLICATION FILED JULY 11, 1903. RENEWED APR. 29, 1912.
1,118,135.
Patented Nov. 24, 1914.
33 SHEETS—SHEET 26.
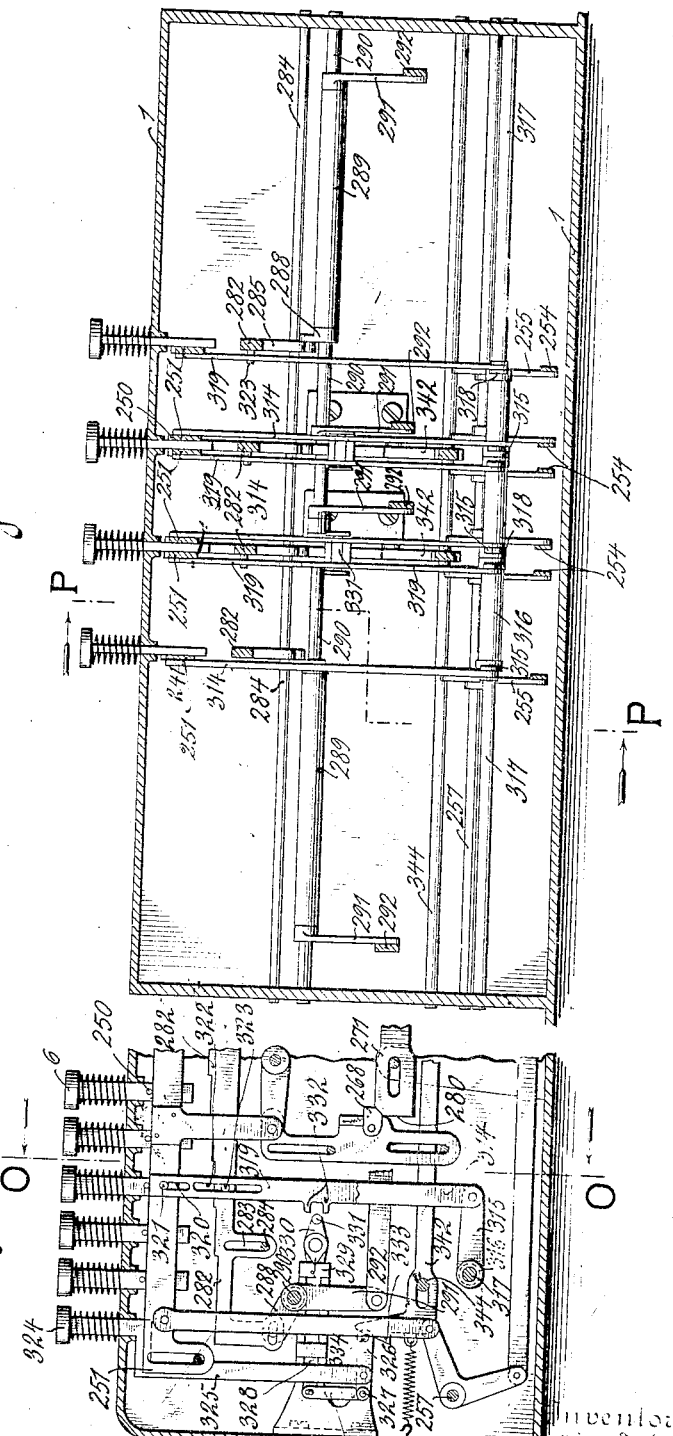

A. D. KENYON.
COMPUTING MACHINE.
APPLICATION FILED JULY 11, 1903. RENEWED APR. 29, 1912.

1,118,135.

Patented Nov. 24, 1914.
33 SHEETS—SHEET 27.

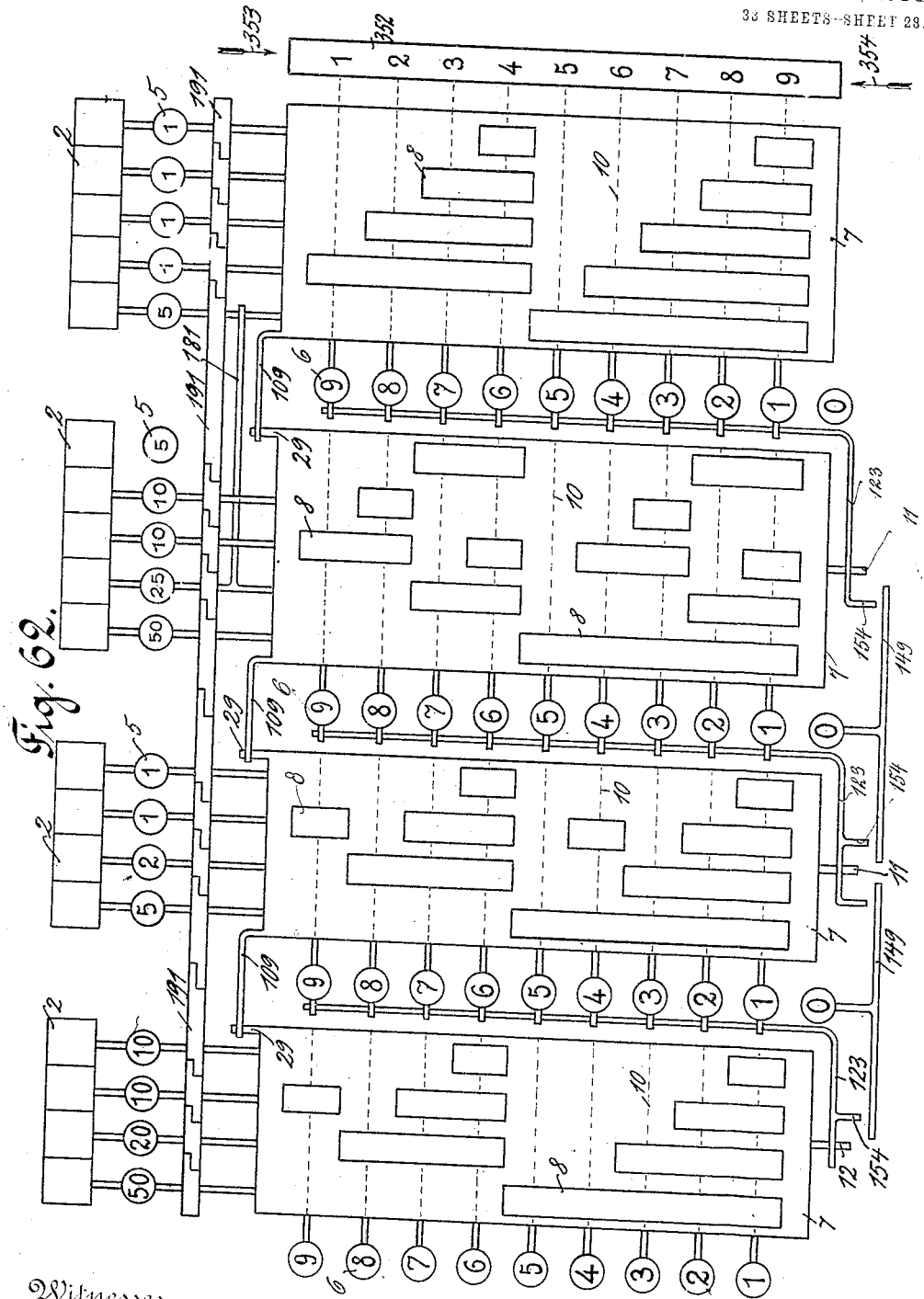

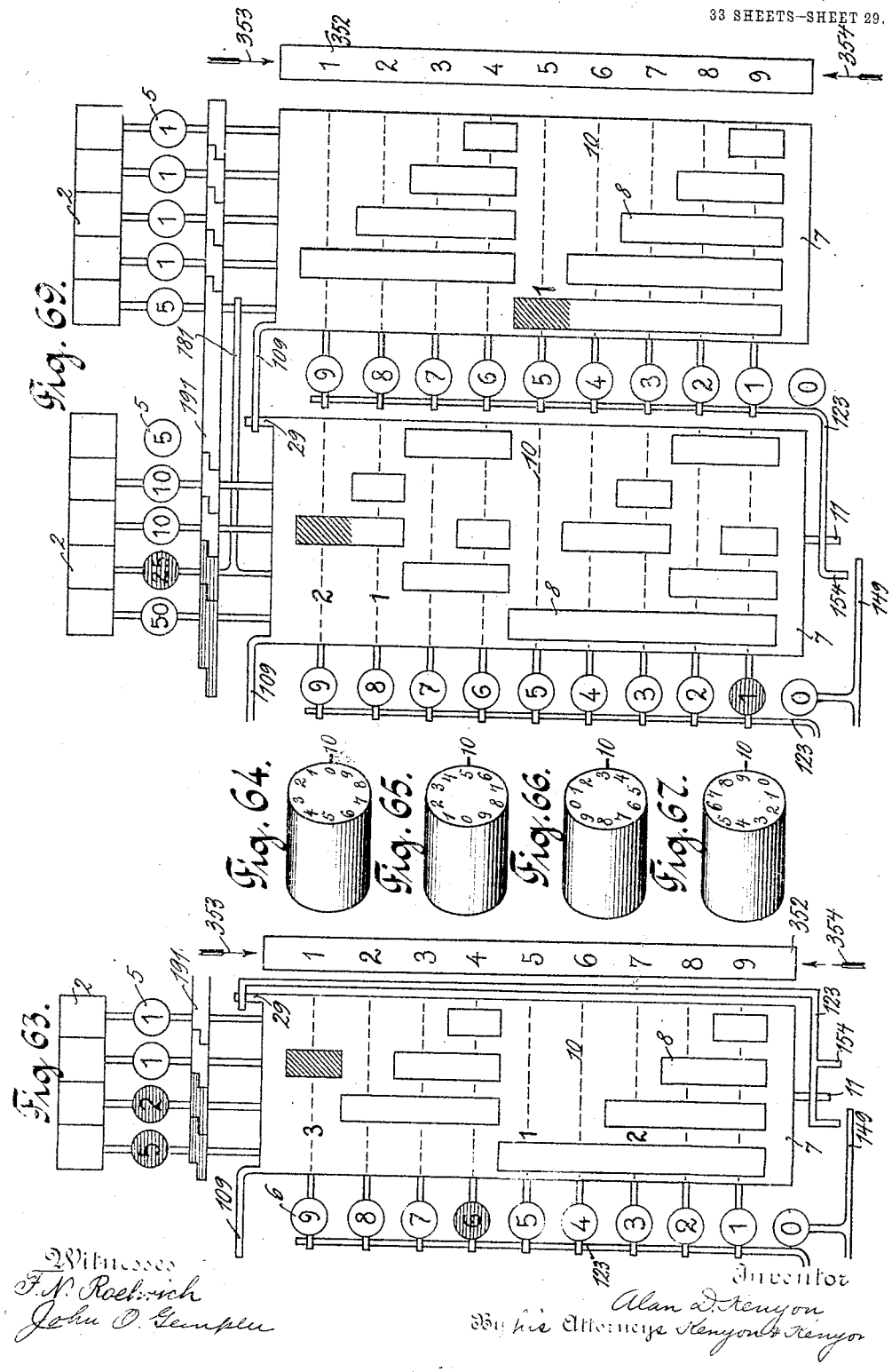

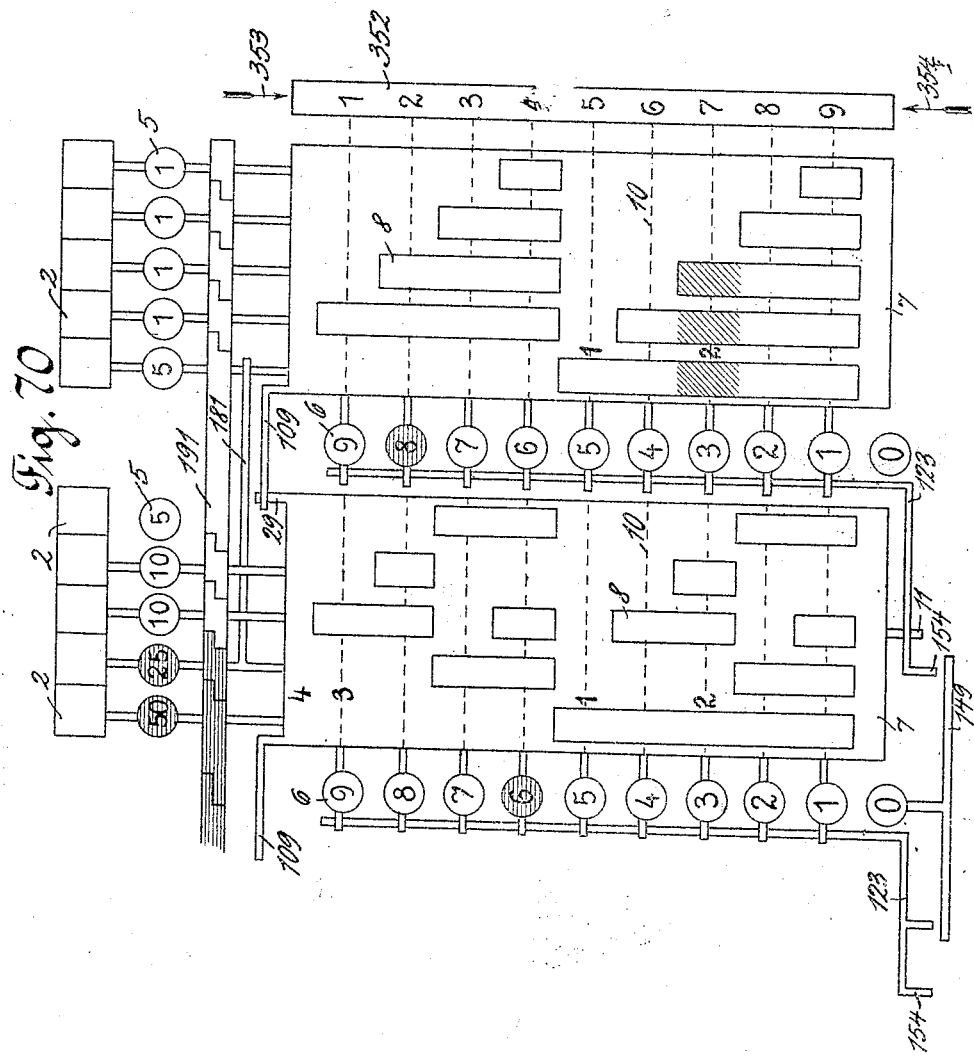

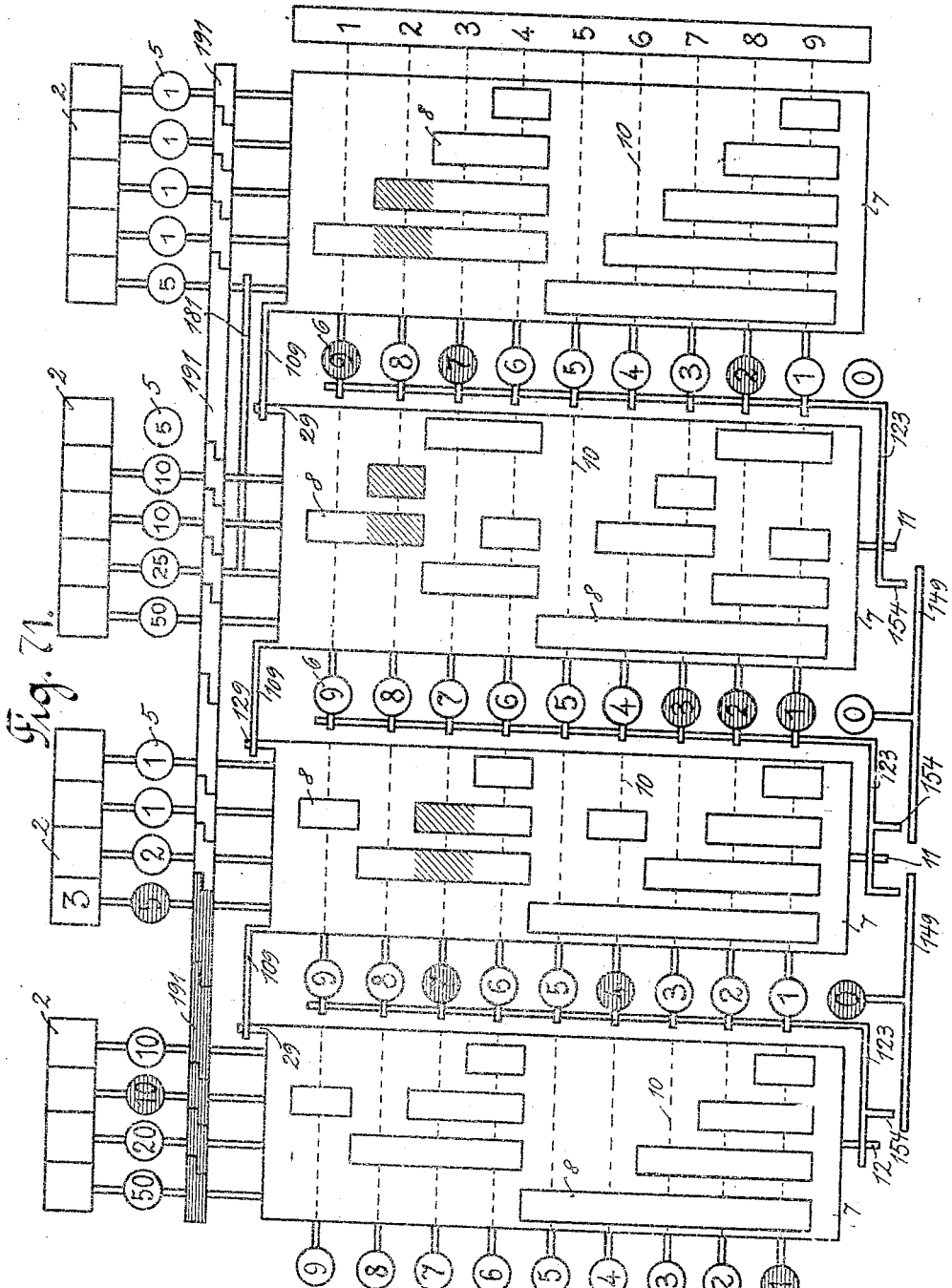

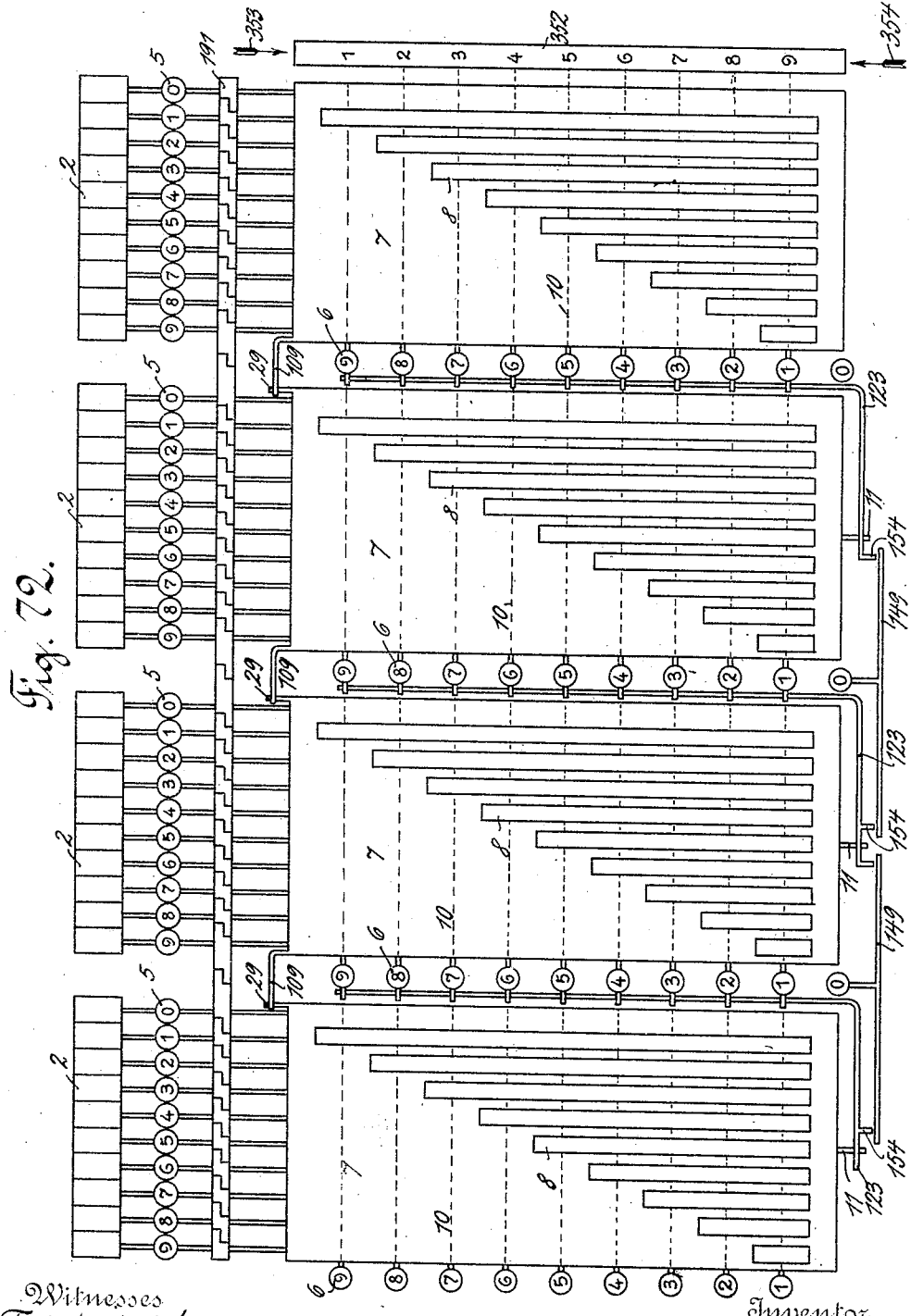

UNITED STATES PATENT OFFICE.

ALAN D. KENYON, OF NEW YORK, N. Y., ASSIGNOR, BY MESNE ASSIGNMENTS, TO THE NATIONAL CASH REGISTER COMPANY, OF DAYTON, OHIO, A CORPORATION OF OHIO.

COMPUTING-MACHINE.

1,118,135. Specification of Letters Patent. Patented Nov. 24, 1914.

Application filed July 11, 1903, Serial No. 165,122. Renewed April 29, 1912. Serial No. 693,940.

*To all whom it may concern:*

Be it known that I, ALAN D. KENYON, a citizen of the United States, and a resident of New York city, in the county and State of New York, have invented certain new and useful Improvements in Computing-Machines, of which the following is a specification.

My invention relates to computing machines. It has for its object to provide a machine for performing computations and for giving results or performing work in accordance with the results of such computation. The work performed by it may vary widely in character; as, for example, that work may consist in merely indicating the results of the computation in any suitable manner, or it may consist in performing work dependent upon those results, as, for example, in mechanical cashiers in paying out money. While, in its broad aspects, it is capable of being used in different methods of computation, I have illustrated it in the drawings in the form of an adding and subtracting machine and more particularly in a mechanical cashier for computing the difference between amounts received and purchase prices, and in paying out money representing the difference between the amounts received and the purchase prices or in merely paying out amounts of money.

In all cases the work performed is controlled by the resultant conditions of the computing device. The latter may be of any suitable form. In the form shown this computing device is a rotary one and is provided, preferably, with a plurality of members, one for each denomination of values represented by the machine.

My improved device may be used in computing any values, whether of abstract numbers or compound numbers or a combination of the two. I have illustrated it particularly as an adding and subtracting machine dealing with the denominations of United States money.

My improved computing device is affected one way or the other for purposes of computation; as shown, it is preferably affected one way for adding and the reverse way for subtracting. The only essential, however, is that one operation should give the complement of the other and it is immaterial how that is done. The affecting means controlling the computing device may consist of any suitable devices. As shown, they consist of number devices, consisting of two different sets, one for purposes of addition, spoken of in the description as "deposit keys," and the other set used for subtracting purposes, spoken of hereafter as "purchase keys." These number devices consist of series, each series representing a different denomination of values, and the elements of each series representing different values of that series. In the usual manner such elements affect the computing device or a member of that device corresponding to the same denomination according to the respective values of the number devices.

It is immaterial to my invention in which direction the number devices of one set affect the computing device so long as the two sets affect it so that one shall give the complement of the other. I preferably affect them for this purpose in reverse ways. The resultant condition of the computing device, or of the members composing it, after both operations, gives the final result of the computation, and the work performed by the machine is dependent upon such resultant condition.

I provide suitable carrying and borrowing mechanism affecting the different members of the computing device and my improved devices are preferably so arranged that the operation of the devices can be repeated indefinitely and the carrying and borrowing can be repeated indefinitely in the same operation so that any computation, no matter how long, may be performed upon the machine. For this purpose extra members may be provided of higher denominations. In practice I prefer to have the borrowing mechanism depend directly upon the operation of the substracting number devices or purchase keys. I also provide means for causing any number device, that contains in value a fraction of the unit of the denomination which it represents, not only to move its corresponding member of the computing device in accordance with the value of the units of said denomination that it represents but also to affect in the same way or direction the next lower member of the computing device in accordance with the value of the fraction which said number device contains. I also preferably provide number devices which are so constructed that, when operated, any number device may, if desired, return at once to its original position ready for immediate operation again, should that be desired, so that the number devices can be operated an indefinite number of times in the same computation and the computing device will give at the end of the computation a result corresponding to the result of the entire computation. My computing device is also so arranged as preferably to be positively held, except when being moved one way or the other for purposes of computation. This enables any length of computation to be made upon the machine. I also provide means for freeing the computing device from its locking means, when it is desired to return the computing device to normal position. I also provide improved and simplified means for paying out money, as distinguished from paying out the difference between amounts received and purchase price, and so construct the parts involved in this operation that the same keys that are used for addition purposes may also be used for such paying out of money. Heretofore, so far as I know, in the machines of this general character, the purchase keys have been used for that purpose; but as such keys are in reality subtraction keys, they are not adapted for this work without an entire change of all their connections. Whereas, the deposit keys, being in reality addition keys, correctly represent amounts to be paid out and all that is necessary to fit them for that purpose in my improved device, is to provide means for disconnecting them from turning the money receptacles in the direction these receptacles are turned when money is deposited in them. I also preferably provide means for locking the main or operating shaft of the machine to prevent the payment of money or the performance of other work until after one or more deposit or adding keys have been operated. In this manner the machine is prevented from paying out the wrong change or amounts of money which would result, if only purchase keys were operated. In this connection I also preferably provide means adapted to be actuated by the deposit keys for throwing out of operation the means for ejecting money from any money receptacle of the value of the deposit key operated and from all higher money wheels.

By reason of my improved devices, machines for performing computations or performing work in accordance with the results of computations; such, for instance, as paying out change representing the difference between amounts tendered and amounts of purchase price, or for paying out sums of money, are very much simplified; tumblers, such as have been found necessary in machines of this character heretofore devised and constructed, are entirely eliminated with all their complications, empiric adjustment, and mechanical difficulties attendant upon them; the parts of such machines are very much reduced in number and made much simpler and more direct and positive in operation; the results of the computation at each and all stages of the same may be made visible to the operator; an indefinite number of values may be computed upon the machine in one computation and all the complications resulting from the presence among the number devices of elements containing a fraction of the unit of any denomination are avoided.

The accompanying drawings, which are referred to herein and form a part hereof, illustrate as one embodiment of the invention, a machine for mechanically performing the operations of adding and subtracting, and particularly for computing the difference between the amount or amounts of money tendered in payment of a purchase and the amount of the purchase or purchases and for automatically delivering an amount of money representing such difference.

Figure 2:
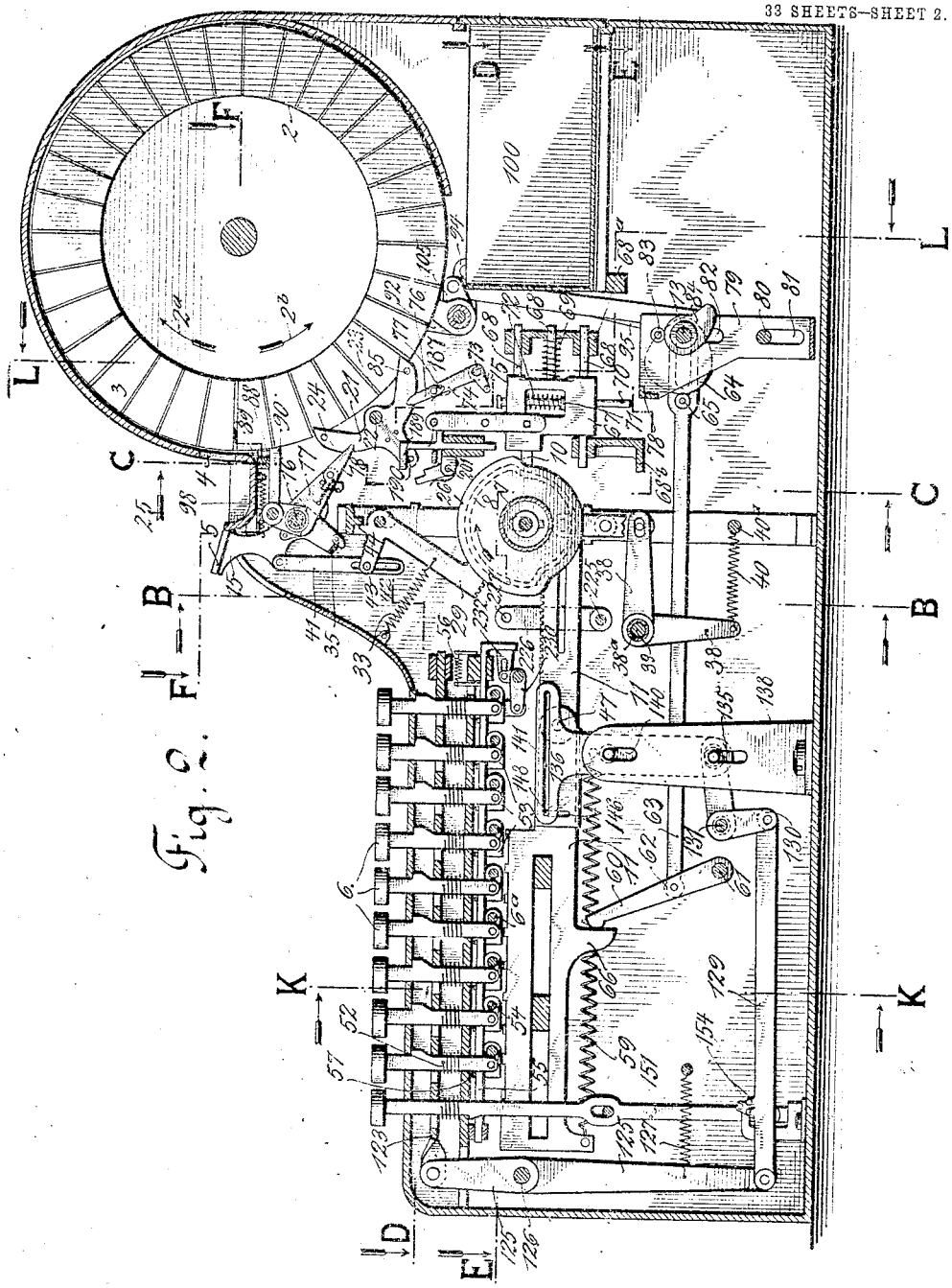
Figure 3:
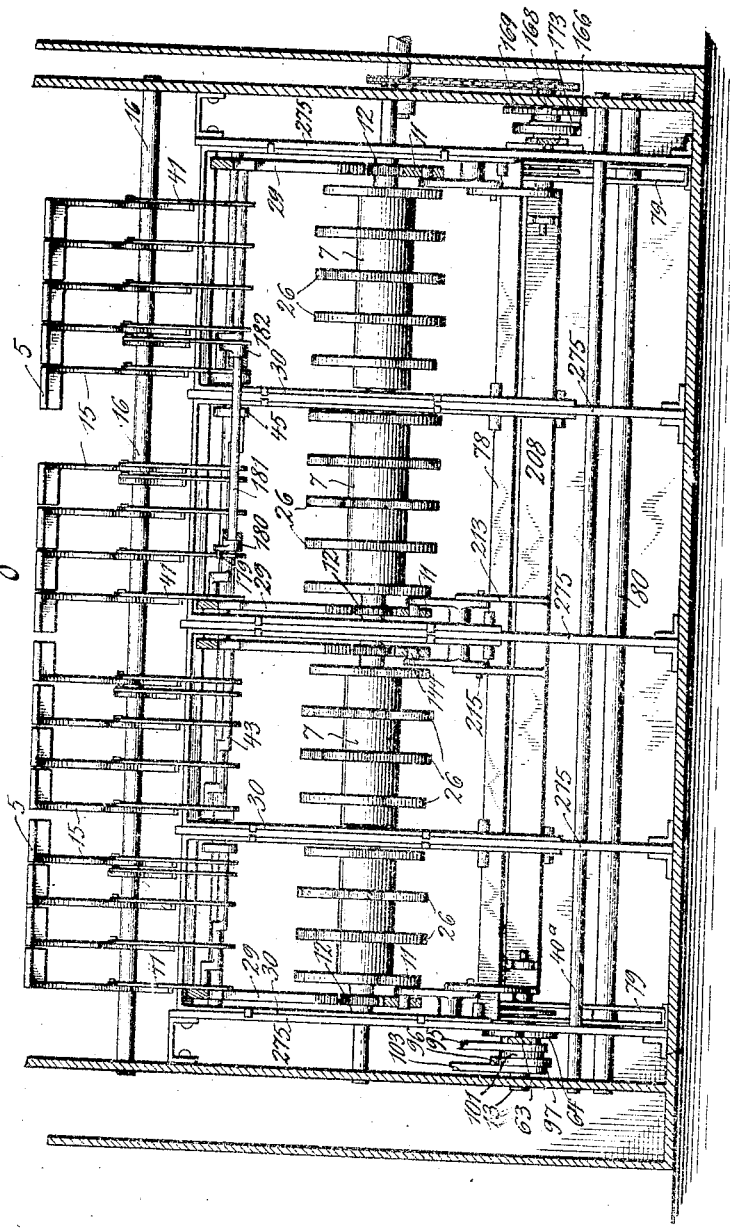
Figure 4:
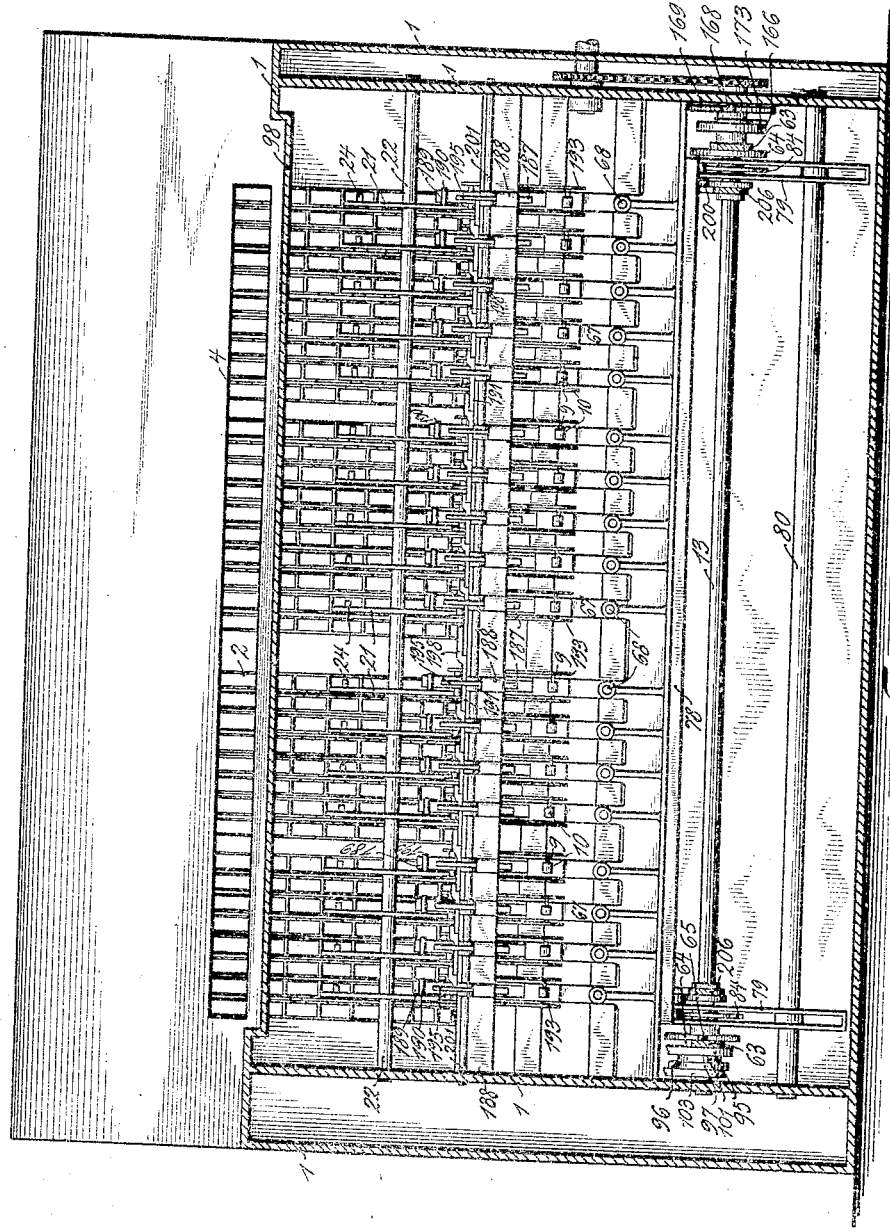
Figure 5:
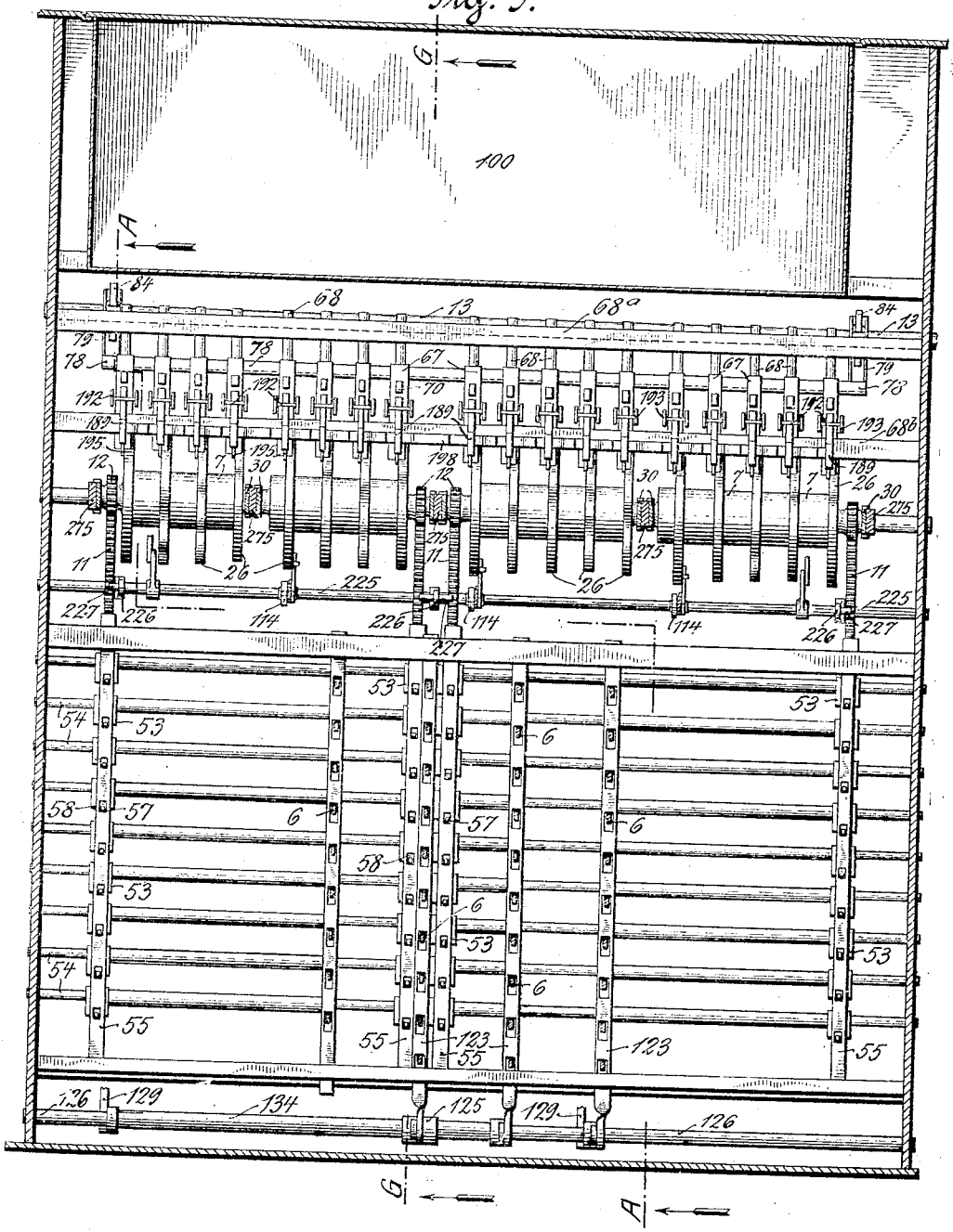
Figure 6:
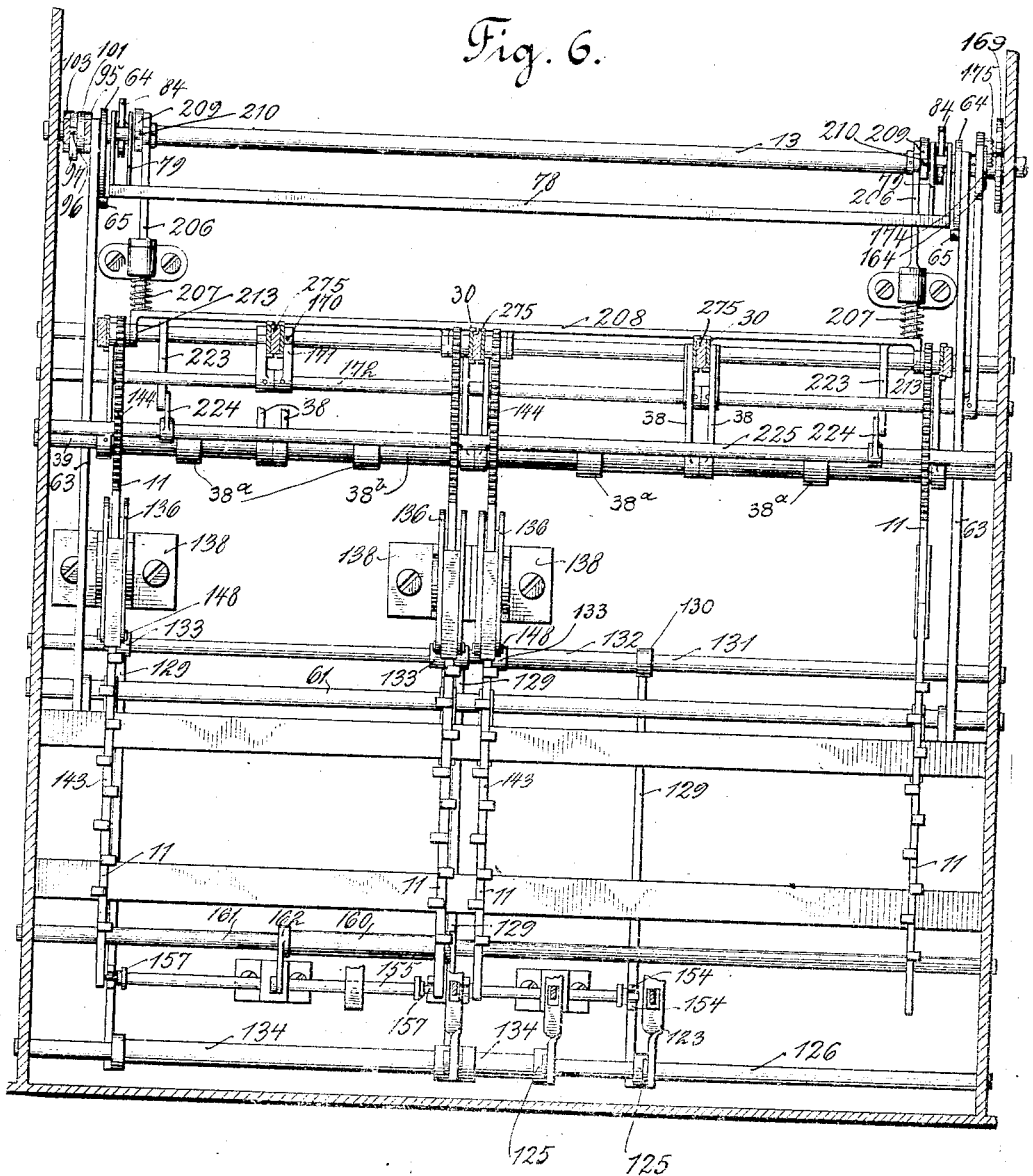
Figure 7:
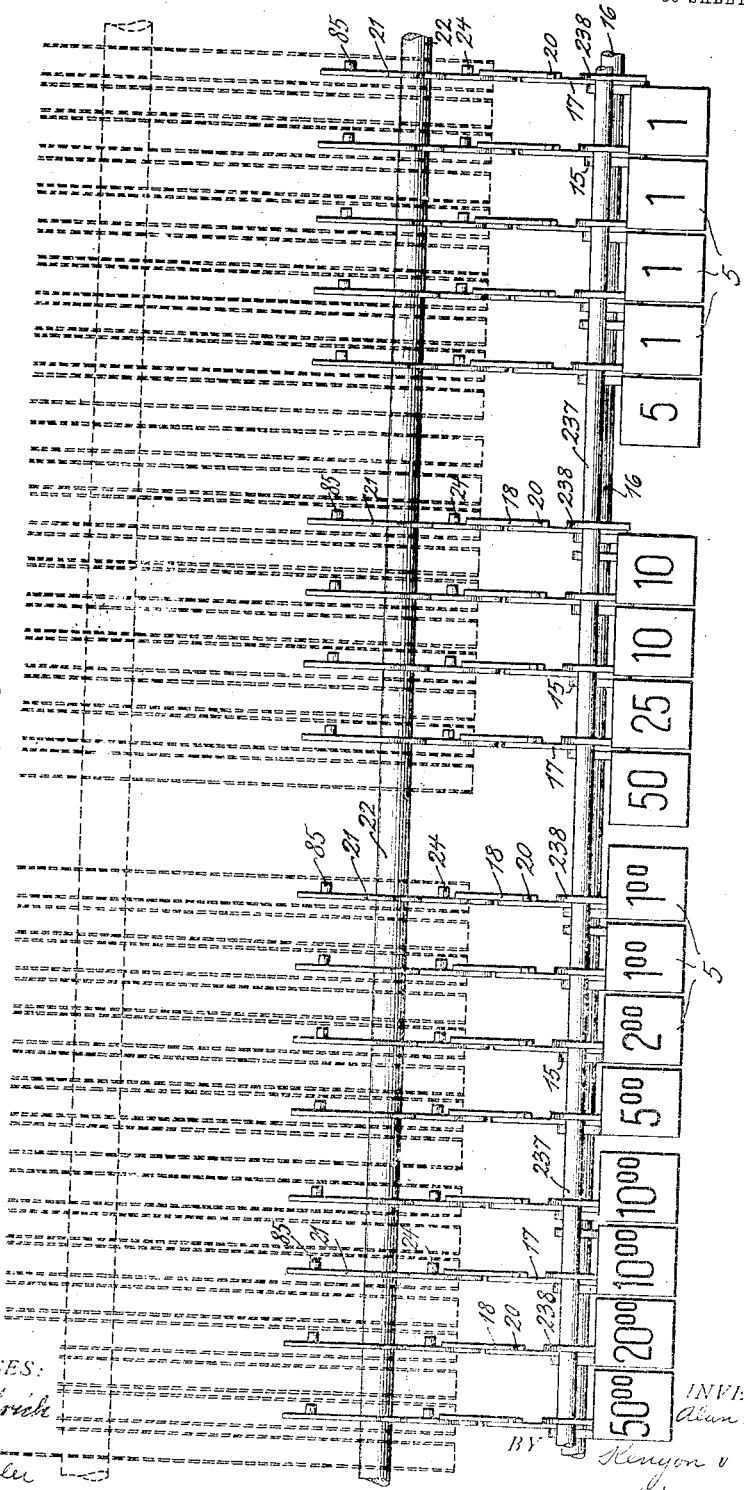
Figure 8:
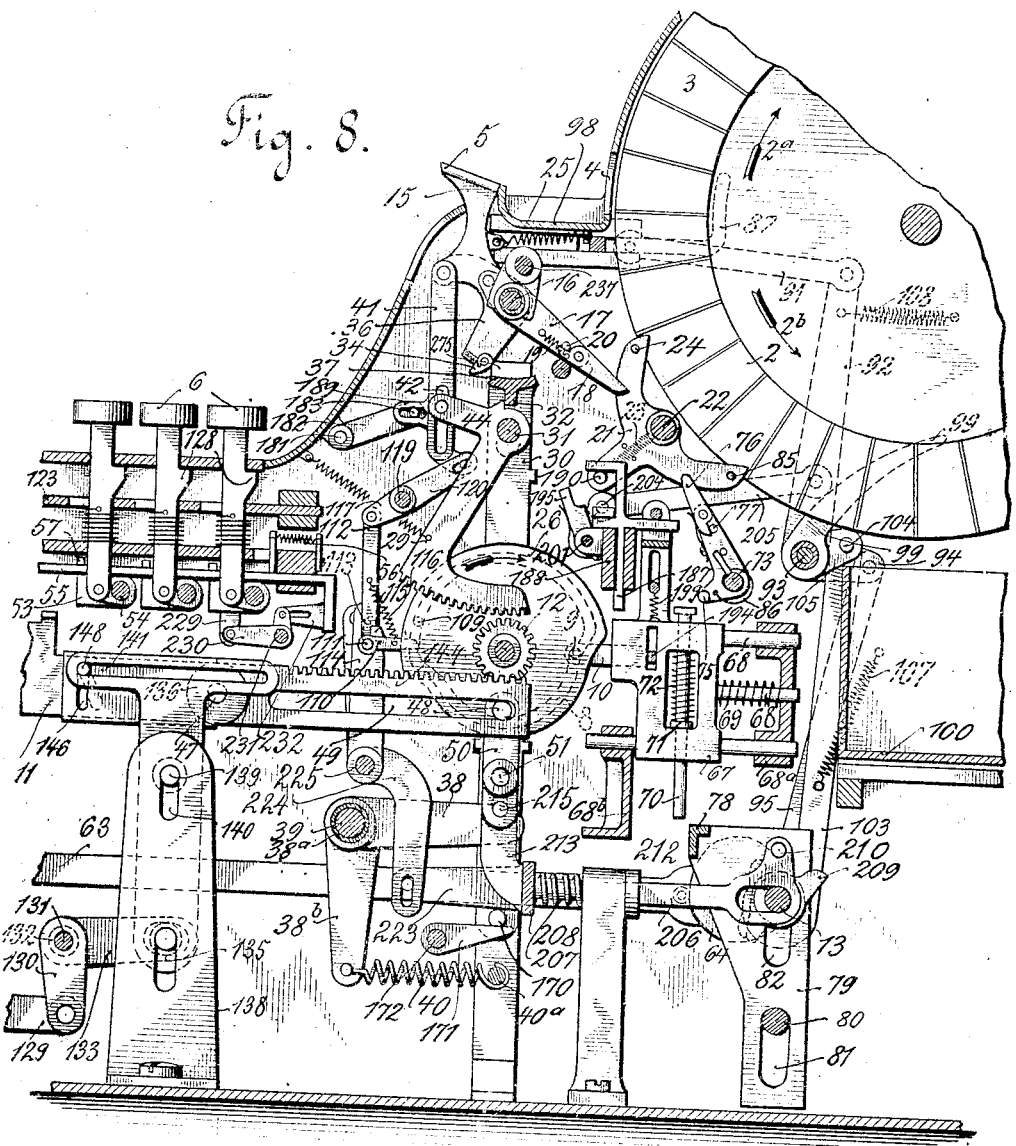
Figure 9:
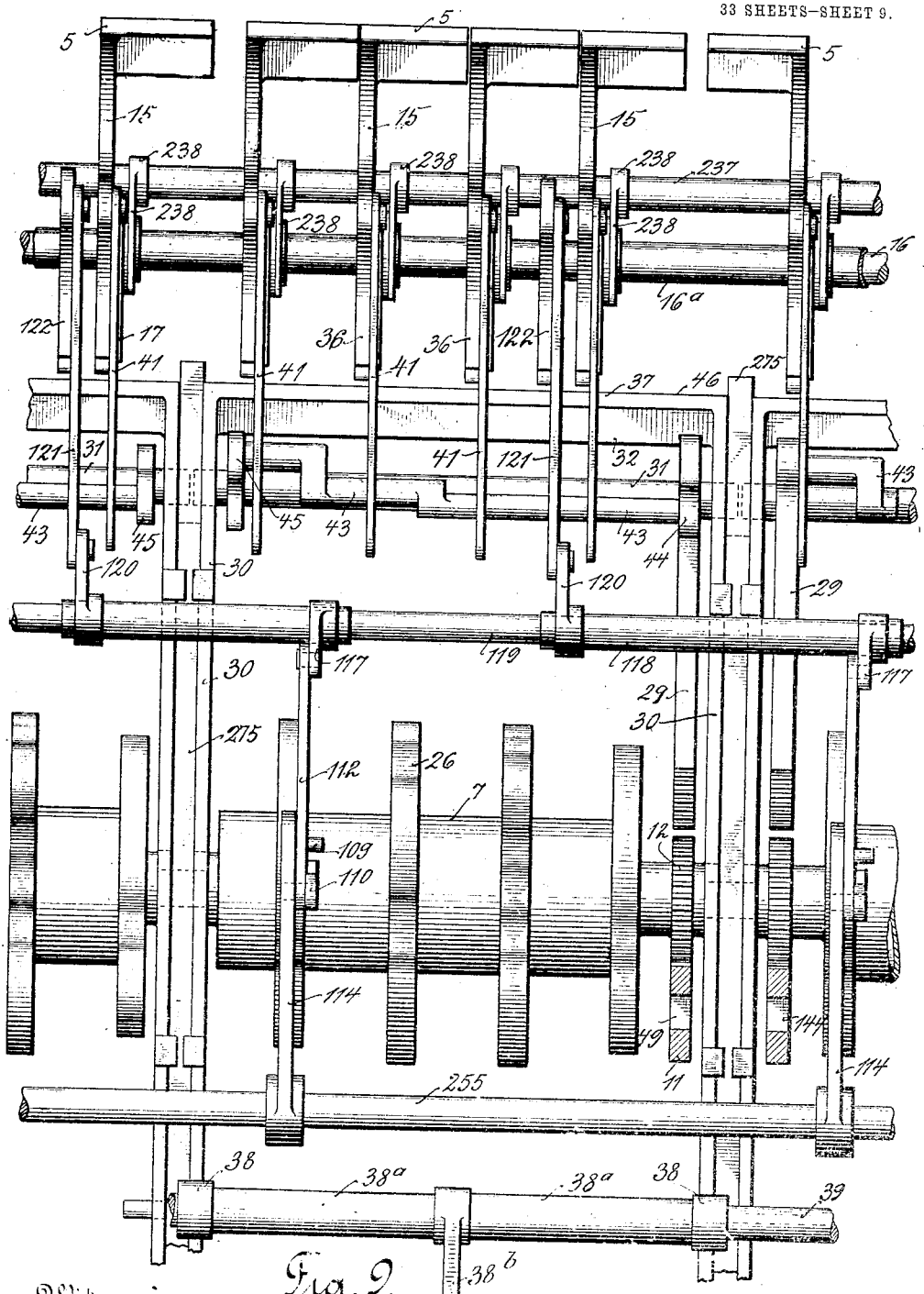
Figure 40:
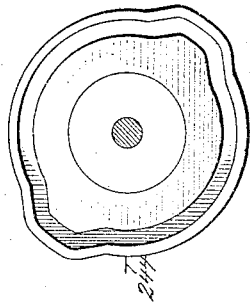
Figure 44:
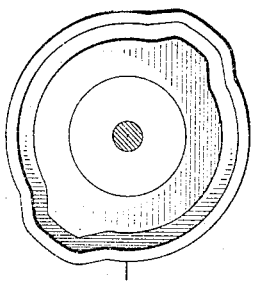
Figure 39:
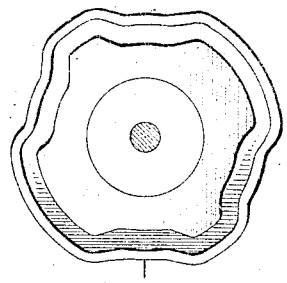
Figure 43:
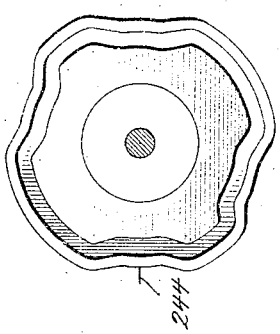
Figure 38:
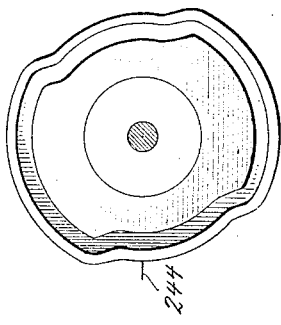
Figure 42:
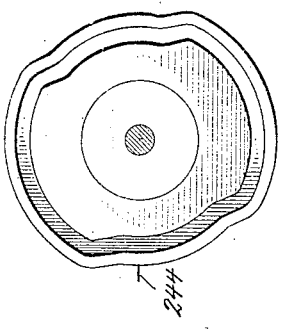
Figure 37:
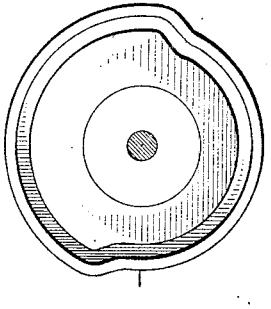
Figure 41:
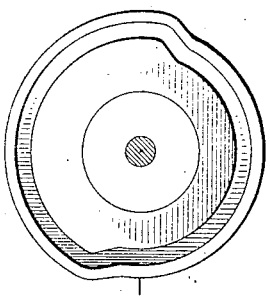
Figure 49:
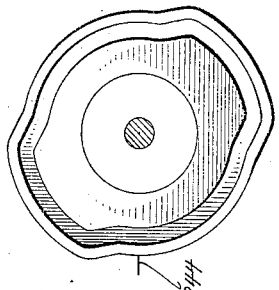
Figure 54:
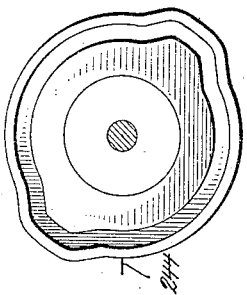
Figure 48:
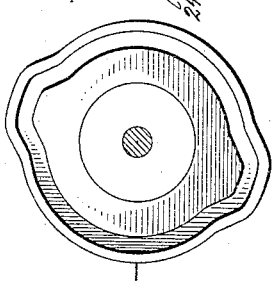
Figure 53:
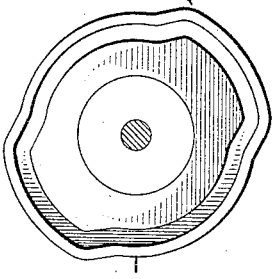
Figure 47:
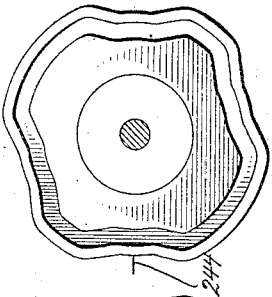
Figure 52:
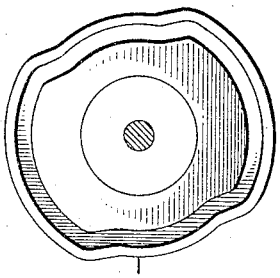
Figure 46:
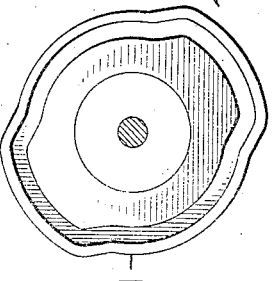
Figure 51:
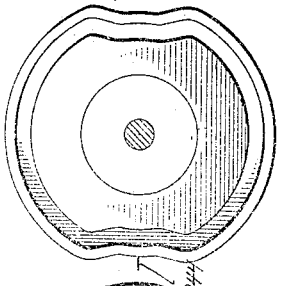
Figure 45:
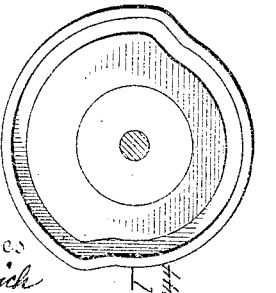
Figure 50:
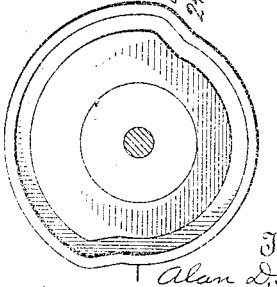

Referring to the specific embodiment of my invention shown in the drawings, Figure 1 illustrates a perspective view of the outside of a mechanical cashier embodying my invention; Fig. 2 is a vertical longitudinal section through the machine on the lines A A of Fig. 5, viewed as shown by the arrow; Fig. 3 is a vertical cross-section on the lines B B of Fig. 2, viewed as shown by the arrow; Fig. 4 is a similar section on the lines C C of Fig. 2; Fig. 5 is a horizontal section taken on the lines D D of Fig. 2; Fig. 6 is a similar section on the lines E E of Fig. 2; Fig. 7 is a horizontal section through the money wheels on the lines F F of Fig. 2; Fig. 8 is a vertical section on the lines G G of Fig. 5; Figs. 9–12 are details of the deposit keys and their connection with the sectors; Fig. 13 is a detail of the devices for unlocking the drums to permit them to return to their normal positions; Figs. 14–16 are details of the devices for locking and unlocking the main crankshaft; Figs. 17 and 18 are details of the devices for causing the drums to return to their normal positions; Figs. 19–22 are details of the devices employed in ejecting money from the money wheels; Figs. 23–26 are details of the borrowing devices. Fig. 27 is a vertical section taken on the lines L—L of Fig. 2, viewed as shown by the arrow; and Fig. 28 is a similar section on the lines K—K of Fig. 2, viewed as shown by the arrow. Figs. 29–33 are details of the paying-out devices; Figs. 34–36 give details of the connections between the 25-cent deposit key and the 5-cent deposit key of the next lower denomination. Figs. 37–54 are detail views of the cams on the different members of the computing devices, Figs. 37–40 representing the cams of the eagle period, Fig. 37, $50; Fig. 38, $20; and Figs. 39-40, $10 each, these corresponding to the values of the deposit keys of that denomination. Similarly Figs. 41-44 represent the disks of the dollar denomination, representing, respectively, the $5, $2, and two $1 values; Figs. 45-49 represent the disks corresponding to the dime denomination and Figs. 50-54 those of the cents denomination. Figs. 55-61 illustrate a modification of my improved device, Fig. 55 being a vertical longitudinal section on the lines M—M of Fig. 56, Fig. 56 being a horizontal section on the line N—N of Fig. 55, Fig. 57 being a detail sectional side view of the borrowing mechanism, on the lines P—P of Fig. 58 being a vertical section on the lines O—O of Fig. 57. Fig. 59 is a detail side view of the locking mechanism for the computing device. Fig. 60 is a front view of the parts shown in Fig. 59, looking in the direction of the arrow. Fig. 61 is a similar view with the lock removed. Figs. 62-72 are diagrammatical views for the purpose of illustrating the principles and operation of the invention.

My invention in the form illustrated in the drawings is, as there shown, embodied in a mechanical cashier which mechanically computes the difference between the amount or amounts of money received and an amount or amounts of purchase and automatically delivers the change representing such difference. In operation, the machine adds the amount or amounts received and from such sum deducts the amount of the purchase price or purchase prices, and then mechanically delivers the proper change. Where but one amount of money is received, this sum is added to zero, the normal condition of the computing device of the machine; and where two or more amounts are received, they are added to each other.

Before proceeding to describe the machine shown in the drawings in detail, I will briefly refer to its principal parts and the work performed upon them.

1 represents the casing of the machine in which the working parts of the machine are inclosed. A set of money receptacles is provided for holding the amounts of money received and paid out. While these may be of any suitable shape or construction, I have shown them as a set of money wheels 2, each wheel provided with a series of money compartments 3.

4 is an opening in the casing extending across all of the wheels for the insertion and ejectment of money into or out of the money compartments.

5, 5 are the deposit keys to represent the amounts of money received. Any desired number of these may be provided and, as shown, they represent the different bills and coins of United States money in current issue. These deposit keys represent different values of different denominations as, for example, the first five keys on the right in Fig. 7 represent, four of them one value and the other one a different value of the denomination of cents, the four keys to the left represent different values of the denomination of dimes, the next set to the left those of dollars, and the four at the extreme left represent different values of what I call the eagle denomination.

The deposit keys affect the result-giving means of the machine, hereinafter to be described, one way for the purposes of the computation. 6, 6 are the purchase keys which, as shown, consist of a bank of keys composed of different rows in the ordinary way, each row representing a different denomination of values. These keys affect the result-giving means of the machine the reverse way from that of the deposit keys 5. As shown, the deposit keys affect or move the computing device one way for purposes of addition and the purchase keys affect or move it the other way for purposes of subtraction in a manner hereinafter to be described.

The main part of the result-giving means in a machine consists of a computing device. In the form shown, it is a device for adding and subtracting, consisting of members, one member for each denomination of values. Each member of this adding and subtracting device is shown as a drum 7 provided with a series of cams. As shown, there are four drums 7. Each cam is represented as a cam groove 8 in one phase of the cam into which projects a pin 9 extending from a finger 10. Each finger 10 is free to move horizontally and is moved backward or forward by means of the cam groove and pin. When in its forward position, that is its position toward the front of the machine, it is inoperative; but when moved into its backward position, it becomes operative to set into position devices which thereafter put out money from the money wheel corresponding in value to that represented by its cam wheel. A cam wheel is provided for each money wheel. Each deposit key 5, when depressed, moves its corresponding drum one way a distance corresponding to the value of the key depressed. Each purchase key 6 moves its corresponding drum in the reverse direction a distance equal to the value of the purchase key. The resultant condition of the cams of any drum thereby affected will render operative the device for ejecting money from such money wheels as will together represent the difference between the value of the deposit key or keys depressed and the purchase key or keys depressed, the computing device, through the resultant positions of the different drums, in effect computing that difference, and through the fingers 10 effecting the mechanical delivery of the change corresponding to such difference.

In practice, any bill or coin tendered in payment of a purchase is passed through the opening 4 into the opposite compartment 3 of the wheel 2 representing the value of such bill or coin. The corresponding deposit key 5 is then depressed. Through devices to be herein described this turns said money wheel in the direction of the upper arrow 2ᵃ in Fig. 2, removing the bill or coin from sight; the deposit key thus depressed next moves its corresponding drum 7 one way a distance representing the value of the deposit key, as already described, thus adding on that drum a value represented by the deposit key. The deposit key immediately returns to its original position, when the finger of the operator is moved from it. Another deposit key can then be struck in a similar manner, if another bill or coin is included in the amount tendered, and so on for each bill or coin thus included, each key thus struck adding on the computing device its value to the preceding amount. The purchase keys representing the value of the purchase are then depressed with the effect, as already described, of moving the proper drum or drums the reverse way, thus subtracting the amount of the purchase price. In the form shown, these purchase keys do not themselves directly move the drums but merely set stops to limit the movement of subtracting bars 11 which engage with gear wheels 12 mounted on drum 7. These subtracting bars are not permitted to operate until the main shaft 13 of the machine is turned by means of a crank handle 14. The turning of the crank handle also causes the money wheels from which money is to be ejected to be turned in the direction of the lower arrow 2ᵇ, shown in Fig. 2, bringing filled compartments of such wheels opposite the opening 4, and then operates ejecting devices for throwing the money from such compartments. The operation of the crank handle also returns the keys and certain other of the operated parts of the machine to their normal positions. Whenever, in the operation of the machine, a drum 7 is moved a full revolution in the adding direction, it will carry one to the next higher drum; and, whenever a purchase key is depressed, it will borrow one from the drum of the next higher denomination. Means are also provided for paying out any sum or sums of money that may be desired, and which do not represent the difference between amounts received and purchase prices.

I will now proceed to describe in detail the various parts and operations of the machine shown in the drawings.

*The deposit keys, the money wheels, the drums, and the connecting devices.*—These are illustrated, particularly in Figs. 2, 3, 7, 8, 9, 10, 11, and 12. When a bill or coin is received in payment of a purchase, it is passed through the opening 4 into the opposite compartment 3 of the money wheel 2 representing the value of the bill or coin. A corresponding deposit key 5 is then pressed downward. The first effect of this operation of the deposit key is to turn the corresponding wheel 2 upward in the direction of the arrow 2ᵃ in Fig. 2, withdrawing the deposited bill or coin from sight and reach. This is accomplished as follows: Each deposit key consists of a lever 15, loosely pivoted on a fixed bar 16. Fixedly secured to lever 15 in the ordinary operation of the machine is a part 17 provided with a spring-pressed yielding toe 18. A spring 19 tends to hold toe 18 against a stop 20 projecting from the side of part 17. 21 is a double dog, loosely mounted on fixed shaft 22, there being one dog for each money wheel. Each dog 21 has two members, as shown in Fig. 8, adapted to be held normally by a spring 23 in engagement with the partitions of itself corresponding to the money wheel 2, as shown in Figs. 2 and 8, thus locking the money wheel from movement in either direction. When a deposit key is depressed, toe 18 is forced against a pin 24 projecting sidewise from the upper end of the dog 21, forcing the upper member of the dog further into the compartment 3 and forcing the lower member out of its compartment 3 of the same wheel 2. In its further movement toe 18 strikes against a partition of the money wheel 2 and moves it upward in the direction of the upper arrow 2ᵃ of Figs. 2 and 8, removing the bill or coin that has just been deposited out of sight and reach. As soon as toe 18 passes pin 24, dog 21 returns to its original position, its lower member entering the next lower compartment 3 of the wheel 2, and as the wheel is forced further upward, one partition of the wheel strikes against the inclined surface of the upper member of the dog, pressing opposite it, whereupon both members of the dog resume their locking position. A spring 25 returns deposit key 5 and its connecting parts to their original positions, when the operator's finger is removed from the key. In this return movement toe 18 slips idly by pin 24 without moving dog 21.

While any suitable device that is capable of being affected in reverse ways may be used as the computing device of my invention, irrespective of its form or whether its movement is rectilinear or rotary, I prefer to employ for that purpose a series of drums 7, each drum 7 constituting a member of the computing device and each drum 7 representing one denomination of the values represented by the deposit keys 5 and purchase keys 6. Each drum 7 is adapted to be controlled through suitable connecting mechanism by each of the deposit keys 5 representing different values of the same denomination and is also adapted to be controlled by the purchase keys 6 representing different values of the same denomination, the deposit keys 5, affecting the drums 7 in one direction, and the purchase keys 6 in the other. It is immaterial in which direction the keys 5 and 6 affect the drums, so long as it is in the reverse direction. As shown, the deposit keys 5 are adapted to move the drums 7 in the direction of the arrow shown in Fig. 2, and the purchase keys in the reverse direction. Each drum stands normally at a point representing zero with the finger 10 in its forward or inoperative position. As each deposit key 5 is depressed, it moves its corresponding drum 7 a distance equal to the value of the key, and the cam groove 8 in the side of the disk 26 which stands opposite to or corresponds with the deposit key is depressed and with its corresponding money wheel is so arranged as to push finger 10 backward, when drum 7 has reached the position to which it is moved by the said deposit key. The cam grooves of the disks 26 of lower values on the same drum are so arranged that the fingers of enough of them are made operative to make up a value equal to that of the key depressed. For this purpose I provide as many disks 26 on each drum 7 as there are deposit keys and money wheels of that denomination. For example, as shown in Fig. 3, five disks are provided for each of the denominations of cents and dimes and four for each of the higher denominations. Thus, if the $5 deposit key is depressed, it will move drum 7 of the dollar denomination so as to bring the left-hand disk 26 into such a position as to cause its cam groove to force pin 9 and finger 10 back into operative position. In this position of the drum the cam grooves on the other disks 26 are so arranged that the fingers 10 of these disks will be in their forward or inoperative position. If now the $2 deposit key should also be depressed, it will move the same drum 7 in the same way, as shown by the arrow in Fig. 2, two additional points, representing a position where the amount is 7. In this position of the drum the cam grooves 8 on the various disks 26 of that drum are so arranged as to make operative those fingers 10 which will cause 7 dollars to be paid out, should the machine be operated in that condition. These might be either the $5 disk and $2, or the $5 disk and the two $1 disks. Either way of arranging the cams would of course answer the purpose. Within certain limits the cam grooves on the various disks on each drum may be varied, as desired. The only essential is that whenever a drum stands in a position representing a certain value, the parts of the cam grooves then opposite the fingers 10 of the drum must among them be in such condition as to render the ejecting devices of such of the corresponding money wheels as to pay out an amount equal to that value. For example, if the drum 7 of the dollar denomination stood at a point representing the value of 7, the cam grooves 8 should stand so as to make the fingers 10 of the disk 26 correspond to the $5 money wheel and the disk corresponding to the $2 money wheel operative, or the fingers corresponding to the disks of the $5 money wheel and the two $1 money wheels. I have illustrated in the diagrams of Figs. 62 to 72, inclusive, and in Figs. 37 to 54, inclusive, one arrangement of these cam grooves. Any other suitable arrangement may of course be employed.

As it is necessary to hold the different members of the computing device rigidly in any set position to which they have been moved, I provide locking means for that purpose, yet any suitable locking means may be employed that are adapted to be thrown out of operation, when it is desired to move the drums one way or the other. Such devices may be distinct from the means employed to move the drums one way or the other. I have shown however in a machine illustrated in Figs. 9 to 12 of the drawings these locking means as constituting a part of the means for moving the drums one way or the other, as will be presently described.

The connections between the deposit keys and the corresponding drums 7, as specifically shown in the drawings, consist of the following: Each denomination of deposit keys is provided with a common sector 29 provided with teeth adapted to mesh with the teeth of gear wheel 12 on corresponding drum 7. As shown in Fig. 8, this sector is normally so placed that its teeth are out of engagement or connection with gear wheel 12. In order to bring it at the proper time into connection with the gear wheel, I preferably mount the sector on a vertical sliding frame 30 pivoting sector 29 to it at 31. 32 is a stop at the upper part of frame 30 against which a projecting part of sector 29 rests to hold the sector in its normal position. It is held in such position by means of spring 33, see Fig. 2. Dependent from the lower part of lever 15 is a toe 34 normally held by spring 35 against a stop 36 on lever 15. As a deposit key 5 is depressed, toe 34 strikes against the inclined upper surface 37 of frame 30, forcing the frame downward until sector 29 meshes with gear 12. Frame 30 is supported in suitable guide bars 215, and at its lower ends are pivoted arms 38 connected through a sleeve 38ᵃ with lever 38ᵇ fulcrumed on a cross shaft 39 secured to the frame-work of the machine. A spring 40, connected to lever 38ᵇ and to cross rod 40ᵃ, tends to hold frame 30 in its particular position. Pivoted to lever 15 is a link 41 having a slot 42 toward its lower end. Through each slot 42 of the links 41 belonging to the deposit keys of the same denomination, passes a stepped rod 43 secured at one end to an arm 44 of sector 29 fixed on shaft 31. The other end of stepped rod 43 is supported by another arm 45 fixed to shaft 31. Shaft 31 being pivoted in the sliding frame 30 allows the sector 29 to be put in or out of engagement with gear 12.

By the above arrangement one sector 29 answers for all of the deposit keys of one denomination. In practice, I prefer to make the different deposit keys move downward exactly the same distance. In order therefore to provide that the different deposit keys representing different values of a denomination should move sector 29 different distances, according to their different values, the stepped rod 43 is arranged so that link 41 will move downward a different distance for the different values before it begins to move sector 29. For example, the link 41 will move further down before striking the stepped rod 43, when the $2 deposit key is pressed, than if the $5 deposit key would have been pressed. The vertical location of the rod and the slot are thus arranged, for example, so that with the $5 deposit key the sector will be moved five points, while with the $2 deposit key it will be moved but two, and with each $1 deposit key it will be moved but one point.

In order that links 41 will not make contact with stepped rod 43 until after toes 34 have forced frame 30 downward to bring the sector 29 into engagement with gear wheel 12, I preferably allow for this by a slight upward extension of slots 42 more than would otherwise be required. After toe 34 has passed the beveled surface 37, and by such passage depressed the sliding frame 30, and therethrough put the sector 29 in engagement with gear wheel 12, it travels along a curved continuation 46 of the high part of the beveled surface 37, thus keeping sector 29 and gear wheel 12 in engagement until sector 29 has completed its stroke by which time the toe 34 has reached the end of the curved surface 46, allowing sliding frame 30 to return to its normal position, thus disengaging sector 29 from gear wheel 12, allowing it to return to its normal position without taking the gear wheel 12 with it. With the return movement of deposit key 5, which takes place immediately after the operator takes his finger from it, the toe 34 and its connecting parts are also returned to their normal positions without affecting frame 30, this being affected through the giving of the spring 35, which holds the toe 34 against its stop 36, during its depressing movement, allowing the toe 34 to turn in the opposite direction of this stop, and thus passing surface 46 ineffectively.

In the normal position of the parts shown in the drawings, the corresponding subtracting bar 11 is in mesh with gear wheel 12, as shown in Fig. 10, and sector 29 is out of mesh with the gear wheel. When frame 30 is depressed and sector 29 is brought into mesh with the gear wheel, subtracting bar 11 is moved out of mesh; and when sector 29 is moved out of mesh, subtracting bar 11 is moved back into mesh. In order to provide for this movement, subtracting bar 11 has toward its backward end a piece 144, movable vertically, and hinged at 47 to the forward part 143 of bar 11. This rear part 144 of bar 11 is supported at its rear end by means of a pin 48 passing through a slot 49 in bar 11. Pin 48 projects sidewise from the upper end of a short lever 50 fulcrumed at 51 to sliding frame 30. Lever 50 and pin 48 in the normal position of the parts move vertically up and down with frame 30, when frame 30 is depressed, the rear end of subtracting bar 11 is moved out of mesh with gear wheel 12 and when frame 30 rises, it is moved into engagement with the gear. These movements are so timed that either sector 29 or subtracting bar 11 is always in mesh with the gear wheel, thus positively holding the drum at all times and in any set position to which it is moved. This in effect locks the drum except when it is to be moved one way or the other for computing purposes. Other locking means may be employed for this purpose, if desired, but I prefer to use the effecting means themselves for this purpose. I have shown the subtracting bar as the one in normal engagement with the drum but this is not essential, as the parts in this regard could be reversed, if desired. All that is essential is that there be locking means at all times during the regular operation of the machine and that such locking means be rendered inoperative, when it is desired to move the drum one way or the other.

I have shown the affecting means consisting of the deposit keys and their connections as returning at once to their normal position after affecting the computing device without disturbing the condition of the computing device. By reason of such construction such affecting means may be repeatedly operated. Thus the same deposit key can be at once depressed again or any other key of the same denomination and the amount or amounts represented by such key or keys will be added successively upon the computing device. The condition or position of the concluding device at this juncture will represent the total sum of the values of the deposit keys thus operated.

*The purchase keys and the subtracting*

*bars and their connections.*—These are illustrated more particularly in Figs. 2, 3, 4, 5, 6, 8, 9, 19, and 20. Each key is normally held in its upward position by means of a spring 52, see Fig. 2. For each row of keys there is provided a subtracting bar 11 provided with stops, one for each key of the row, which stops are preferably arranged on alternate sides of the bar, as shown in Fig. 6. Each key 6 is provided with a shank, the lower end of which is pivoted to an arm 6ª, fixed to one end of a sleeve 6ᵇ, to the other end of which is fixed a stop 53, made to engage the corresponding stops of subtracting bar 11. Sleeve 6ᵇ is pivotally mounted on a cross bar 54, fixed to the framework of the machine. Each row of keys has a locking bar 55 normally held in its backward position by spring 56. Each stop 53 has a toe 57 normally projecting upward through an opening 58 in the locking bar 55. When a key is depressed, toe 57 forces locking bar 55 forward slightly until toe 57 slips from opening 58 under the locking bar 55, whereupon the latter bar is retracted at once by spring 56 to its former position, and toe 57 bearing upon its under surface locks the key in its down position until released, as hereinafter described. The stop 53 of the key is now in position to engage the proper stop on bar 11, when that bar moves backward, as hereinafter described. These stops 53 and stops on the various bars 11 are so arranged as to permit the subtracting bars to move backward a distance varying according to the value of the key depressed in the well-known manner.

Each subtracting bar 11 tends to move backward through spring 59 but is normally withheld from movement in that direction by the stops 60. There are four stops 60, mounted fixedly on a rod 61 pivoted on its end in the framework of the machine. Stops 60 are normally held in their locked position by arms 62 fixed to rod 61 near its ends, and pivotally connected on the upper end to the forward end of bars 63, the rear ends of which are provided with a roller 65 engaging with the surface of cams 64, mounted fixedly on the main driving shaft 13. The rear end of the bars 63 are slidingly mounted on the shaft 13 by means of a slotted extension. In the normal position of the main shaft cam 64 positively holds stops 60 against a downward projection 66 of subtracting bars 11. During the rotation of the shaft 13 cam 64 permits stop 60 to move backward, whereupon springs 59 of the subtracting bars 11 move these bars backward until they are stopped by stops 53. The subtracting bars accordingly move a distance determined by the keys that have been depressed and the drums 7 are moved in the direction the reverse of the arrow in Fig. 2 a corresponding distance or in accordance with the value of the keys operated. The drums are thus moved in the reverse direction to that in which they had been moved by the deposit keys. The deposit keys had moved them one way for adding purposes and the purchase keys now cause them to move the reverse way for subtracting purposes and both are in accordance with the value of the keys operated. The resultant condition or position of the drums represent the difference between the numbers added or subtracted and fingers 10 will now be operated, each corresponding with the proper money wheels to furnish an amount of change equal to the said difference. The movement of the drums in the subtracting directions has occurred during the early part of the movement of crank handle 14 and main shaft 13. During the further rotation of such parts the ejecting devices for throwing out the money from such wheels are actuated and these will now be described.

*The means for turning the money wheels downward and the ejecting means.*—The money wheels from which money is to be ejected are determined by the resultant condition of the drums 7 and this is done through these fingers 10 which are made operative. In the form of the machine shown in the drawings this is accomplished by turning downward in the direction of the lower arrow 2ᵇ, shown in Fig. 2, those money wheels from which money is to be ejected. The devices operative for this purpose are more particularly illustrated in Figs. 2, 3, 4, 5, 8, 9, 19, and 20. Opposite to each finger 10 is a sliding frame 67 provided with guide rods 68 slidingly mounted in the supporting frames 68ª and 68ᵇ fixed to the sides of the machine. A spring 69 normally holds each frame 67 in its forward position, as shown in Fig. 2. Mounted in frame 67 is a vertical rod 70 provided with a collar 71 fast upon it and normally held in its downward position by means of a spring 72. Above each frame 67 is loosely mounted on a rod 73 running across the machine a bellcrank lever 74, having a projecting pin 75 at its lower end, and provided at its upper end with a yielding toe 76 spring-pressed against a pin 77 projecting from the side of lever 74. Normally, frame 67 and rod 70 are in their forward position, as shown in Fig. 2. Whenever a corresponding finger 10 is pushed into its backward or operative position, the finger 10 pushes frame 67 backward until the head of rod 70 comes under pin 75. In this position the lower end of rod 70 is immediately over a piece 78 which extends across the machine between two vertical sliding frames 79 on each side of the machine. Piece 78 is carried by these frames 79, the latter being guided by means of the cross rod 80 fastened at its ends to the framework and projecting through slots 81 in the frames 79 and by slots 82 in the frames 79 working over the main shaft 13. On each frame 79 is a roller 83 with which a cam 84 on shaft 13 is adapted to engage toward the latter part of the revolution of the shaft. Through cams 84 and rollers 83 frames 79 and piece 78 are lifted and the latter carries up with it all of the pins 70 that have been moved backward into operative position by fingers 10. Such rods 70 are then carried upward and they strike pins 75 of levers 74, rocking the levers and forcing toes 76 against the pins 85 projecting sidewise from the lower end of dogs 21, forcing the lower member of the dogs inward, the upper member outward, thus permitting the corresponding money wheels to be moved downward. In the further movement of toes 76 to the right, as shown in Fig. 2, such wheels are moved one space in said direction, bringing opposite opening 4 a compartment of each of said wheels in which there is a bill or coin ready for ejectment. On the return movement of toe 76, it slips idly past pin 85, dog 21 meanwhile having resumed its original position and locking the money wheels from further rotation in either direction. Frames 79 return to their original position after cams 84 have passed through gravity. Levers 74 are returned to their normal position by means of springs 86 secured to fixed shaft 73 and the levers.

Any suitable ejecting devices for ejecting the money from the compartments of the money wheels may be employed. Those shown in the drawings for this purpose are more particularly illustrated in Figs. 2, 8, 21, and 22. They are, as shown, preferably operated from the main driving shaft 13. These ejecting devices consist of an ejecting arm 87 for each money wheel arranged as in Figs. 8 and 22, opposite to and normally in the rear of the compartment in registry with opening 4. These ejecting arms are fast upon a bar 88 which runs across the machine and is supported on each end in a slide 89 adapted to reciprocate in grooves in guide bars 90 secured to the framework of the machine. Pivoted to the rear end of each slide 89 is a rod 91 pivoted to an arm 92 fast on a shaft 93, also fast on shaft 93 at one end is a link 94 pivoted at its other end to a rod 95. At the lower end of the rod 95 a roller 96 rests upon a cam 97 and is raised and lowered by that cam as shaft 13 rotates. Its normal position is down, as shown in Fig. 22. That cam 97 raises rod 95, ejectors 87 are moved forward and they are so arranged as to pass through the compartment of the money wheels standing opposite to opening 4. All of the ejectors 87 move forward each time but only those eject money of course which stand opposite the money wheels that have just been turned downward as above described. The money in the compartments of such wheels registering with opening 4 is thrown out into trough 98 and the amount thus thrown out will aggregate the values corresponding with the resultant condition of the drums or computing devices. In order to eject any surplus moneys that may exist in the compartments of any of the money wheels, I also provide an additional set of ejectors 99, one for each money wheel. These are arranged opposite the compartments in the lower or bottom of the money wheels, as shown in Fig. 8, and they eject the money from these compartments into a receptacle 100. They do not of course eject money unless any wheel has enough to reach to the compartment in question. These ejectors 99 are operated by means of a cam 101 on shaft 13 pressing downward upon a roller 102 secured to a rod 103, the rod 103 being pivoted at its upper end at 104 to an arm 105 which is integral with or secured to a sleeve 106, loosely mounted on shaft 93, which sleeve carries the ejectors 99. A spring 107 returns these parts to their normal positions at the end of the operation. Springs 108, secured to rods 92, return the ejectors 87 to their normal positions at the end of their operation.

*The carrying mechanism.*—The different members or drums of the computing device are provided with connections between said members so arranged that when a member has been moved its full complement in the adding direction it will carry a member of the next higher denomination one step in the same direction. This carrying may be accomplished by any suitable means. The means shown in the drawings are as follows. Projecting from each drum but the one of highest denomination is a pin 109 which stands normally in the position shown in Fig. 8 or just above a short arm 110. Arm 110 is pivoted to a pin 111, projecting sidewise from link 112. Pin 111 is free to move up and down in a slot 113 in an arm 114. A stop 115 projecting from link 112 prevents arm 110 from moving upward relative to link 112, and spring 116 normally holds the arm against the stop 115, as shown in Figs. 8 and 13. When a drum 7 has been moved its full complement or 10 points, pin 109 comes under arm 110 and carries it and link 112 upward until pin 109 slips by 110. This upward movement of link 112 is communicated through an arm 117 fast to a sleeve 118 loose on shaft 119 and an arm 120 also fast to sleeve 118, and link 121 secured to a bellcrank lever 122 rocking the left-hand end of the lever downward. This bellcrank lever 122 is the same in shape as the lower part of the bellcrank lever 15 of the deposit keys 5 and is similarly loosely pivoted on shaft 16 and carries at its lower end a toe similar in all respects to toe 34 on lever 15. This lever 122 and its link 121 are however not connected with any deposit key. Link 121 like link 41 is provided with a slot 42 through which passes a stepped rod 43 pivoted to an arm 44 of sector 29 belonging to the next higher denomination. Accordingly, when pin 109 of any drum forces up its arm 110, it forces downward the toe of bellcrank lever 122, and that forces down the frame 30 of the sector 29 of the next higher denomination bringing it into engagement with the gear wheel 12 of the next higher drum 7, forcing the corresponding subtracting bar 11 out of engagement and moving the drum one point in the adding direction. The engagement of pin 109 with arm 110 is so timed as to move the next higher drum just one point in the direction of the arrow shown in Fig. 8. When it has been moved one point, pin 109 slips out of engagement with arm 110, whereupon the parts are returned to their normal positions by means of springs 40 and 33.

Spring 116 permits pin 109 to pass arm 110 in a subtracting movement of drum 7 and also when that drum is returned that way to its normal position after the operation of the machine.

It is also necessary, where the computing device is composed of members representing different denominations of values, that the different members should be provided with connections from one to the other so arranged that a lower member can borrow one from an upper member. Any suitable means may be employed for this purpose. In the devices shown in the drawings for that purpose, the parts are so constructed that immediately upon the depression of a purchase key 6 the member of the computing device of the next higher denomination is immediately moved one step in the subtracting direction. The form of devices for this purpose shown in the drawings, consists of the following mechanism, which is illustrated particularly in Figs. 2, 5, 6, 8, 23, 24, 25, and 26.

123 is a horizontal bar running parallel to the casing and immediately beneath it, where the keys are placed. One such rod is provided for each row of keys except the highest. Each rod has apertures 124 in it through which pass the keys of its row. At its forward end each bar 123 is pivotally secured to the upper end of a lever 125 loosely fulcrumed on a fixed shaft 126. A spring 127 secured to the lower end of lever 125 tends to hold bar 123 in its forward position with the rear wall of each aperture held against the shank of its key. In the case of the lever 125 in the connections operated by the dime and dollar row of keys the upper and the lower parts of the lever are connected to each other by a long sleeve 134 loose on shaft 126 but integral with both parts of lever 125. This is for the purpose of bringing the parts into their proper position.

128 is an inclined projection from the rearward edge of each keyshank. When a key is depressed, it forces bar 123 toward the rear end of the machine, taking with it the upper end of rocking lever 125, the lower part of the lever engaging spring 127. Pivotally connected to the lower end of lever 125 is a link 129, the rear end of same being pivoted to an arm 130, fixed to one end of a sleeve 132, the other end of which carries an arm 133 provided on its end with a slot to engage guide pin 139$^a$. Sleeve 132 with arms 130 and 133 fixed to it, is loosely mounted on a cross shaft 131, fixed at its ends to the framework of the machine, as shown in Fig. 6 of the drawings. The different arrangements in the different cases consist simply of the different lengths of sleeves 132, in order to be able to place levers 130 and 133 in the position required by the other parts of the device. The guide pin 139$^a$, is adapted to engage with arm 133 through a slot 133$^a$, mounted fixably in a vertical sliding frame 136, and sliding in slots 135 provided in the standards 138. Vertical sliding frame 136 is also provided with a second guide pin 139$^b$ mounted fixably in it and sliding in a second set of slots 140 in standards 138, thus forcing the vertical sliding frame 136 to remain vertical in all positions. Sliding frame 136 is also provided in its upper end with long horizontal slots 141 adapted to carry a sliding pin 148, which forms a connecting part of the borrowing mechanism. This sliding pin 148 is adapted to connect the parts 143 and 144 of subtracting bar 11, through a connecting piece 142 in such a manner that the pin 148, projecting through an inclined slot 147 in part 143, and at the same time, projecting through vertical slots 146 in the connecting piece 142, will through its downward or upward movement, which is imparted to it by the sliding frame 136, make connecting piece 142 and part 144, which is pivoted to it at 47, slide in relation to part 143 of subtracting bar 11, thus accordingly lengthening or shortening the movement of part 144 in relation to the movement of the subtracting bar 11. The above described operation is obtained through the pin 148 being forced on its downward movement to follow the inclined slot 147 in part 143, and at the same time engaging the slots 146 in the two sides of connecting piece 142, forcing this connecting piece 142 to follow its path in the inclined slot 147, thus moving the connecting piece 142 a distance determined on one end through the pin 148 in its highest position, and on the other end through its lowest position in the inclined slot 147, as can be readily seen in Fig. 23 of the drawings. Part 143 ends at the dotted line 145, as shown in Fig. 23, and is entirely surrounded by the connecting piece 142, which again is placed between the two elongated upper ends of vertical sliding frame 136, as shown in Fig. 24. Sliding pin 148 is normally held in its upper position of inclined slot 147, as shown in Fig. 23. When, however, a purchase key of the next lower order is struck, sliding frame 136 is pulled downward and as part 143 of subtracting bar 11 is held immovable by its stop 60, piece 142 is moved rearward because of the inclination of slot 147. This moves part 144 of subtracting rod 11 rearward and the connections are so arranged that this distance will turn drum 7 in a subtracting direction one point. Thus, immediately upon the operation of any key of any row except the highest, one is borrowed from the member of the computing device of the next higher order.

If zero keys are provided, they should not, when operated, borrow from the next higher member of the computing device. But should one or more zero keys be operated, and then a significant figure of a lower order be operated, that significant key in its operation should not only borrow from the member of the computing device of the next higher order but should also borrow from the member of the next higher order; or, should two zero keys be struck, it should borrow also from the third higher order as well, and so on, and any suitable devices may be provided for this borrowing. The particular devices shown for this purpose consists as follows and they are particularly illustrated in Figs. 2, 6, 25, and 26. When the zero key of any series or row of keys, except the lowest or highest, is operated, such zero key is made to connect the borrowing mechanism operated by the next lower series of keys with the borrowing mechanism of the series of keys of which the zero key in question forms a part; and if two intermediate zero keys, one succeeding the other, are struck, the two zero keys together will connect the carrying mechanism operated by the significant figures of the row of keys next lower than the lowest zero key in question, when the borrowing mechanism is not operated by the significant figures of the row of keys of which the higher zero key in question forms a part. In this way the operation of a significant figure after the operation of a zero key or of two or more zero keys of higher orders will cause a borrowing from all of the higher orders up to and including the one next higher than the highest zero key depressed. The particular form of mechanism by which this is done, as shown in the drawings, consists of the following: 149 is a rock shaft, loosely mounted in a sleeve 150, carried by the shank 151 of the zero key of the dimes order, as shown in Fig. 26. When this zero key is depressed, the sleeve 150 with rock shaft 149 are carried downward, bringing pins 152 and 153 carried on arms, one at each end of rock shaft 149, into a pocket formed by two short arms 154 extending upwardly from links 129. In this condition of the parts, if a significant figure key of the cents row is struck, it will not only borrow from the drum representing the dime denomination of values but through pins 152 and 153 and shaft 149 it will borrow from the dollar drum, the shaft 149 being rocked a sufficient distance to move arm 129 of the next higher borrowing device its full borrowing distance. In a similar way the zero key of the dollar row of keys is provided with means adapted to connect the borrowing device operated by the significant figures of the dime row of keys with the borrowing mechanism operated by the significant figures of the dollar row of keys, thus borrowing from the drum representing the eagle denomination. The device consists of a similar rock shaft 155 and sleeve 156 with a pin 157 at each end. These parts are depressed into operative position by the shank 158 of the zero key of the dollar row. In this case however for convenience the connections are made somewhat differently. The lower end of the shank 158 is pivotally connected to an arm 159 fast on sleeve 160, which is loose on shaft 161, and at the other end sleeve 160 has fast upon it a similar arm 162 pivotally connected to a vertical rod 163, the latter rod being secured to sleeve 156 at the middle part of rock shaft 155. The arms 154 into which the right-hand pin 157 takes, is mounted on the same link 129 that carries the arms 154 into which pin 153 takes. Accordingly, should both the zero keys of the dollar and dime row be depressed, the operation of a significant figure of the units row will borrow from the dime, dollar, and eagle member of the computing device.

*Lock on crankshaft unlocked by deposit keys.*—In practice, I prefer to keep the main shaft 13 locked and to unlock it ready for its operation by crank-handle 14, whenever any deposit key 5 is depressed. If this were not the case, and a purchase key were depressed without depressing a deposit key, the wrong amount of money would be delivered to the machine. This is effectually guarded against by locking the crankshaft and unlocking it through one or more of the deposit keys. Any suitable locking and releasing means may be employed for this purpose. Those I have shown in the drawings are particularly illustrated in Figs. 3, 4, 6, 8, 13 to 16, and 21. Referring to these devices, 164, see Fig. 15, is a locking disk fast on the main shaft 13. This disk is provided with a projection 165 against which is adapted normally to lie the nose 166 of rocking lever 167. When the parts are in this position, the main shaft is locked against rotation, as shown in Fig. 15. The shaft 13 is rotated in the direction of the arrow, shown in Fig. 15, to operate the machine. It is prevented from rotating in the other way by pawl 168 engaging with ratchet 169 fast on shaft 13. Normally nose 166 is in its upward position with projection 165 resting against it, as shown in Fig. 15, thus locking the main shaft 13. It is depressed from this locking position, whenever a deposit key 5 is operated, through pin 170 on frame 30 pressing down a short arm 171 fast on shaft 172. This shaft runs across the machine and has four arms 171 secured to it, each engaging with a pin 170 on each of the frames 30. Rocking lever 167 is also fast on shaft 172. The operation of any deposit key of the machine therefore rocks this lever downward, removing nose 166 from its locking position. The moment this occurs, a finger 173, mounted on a disk 174, loosely supported on main shaft 13, is pulled by spring 175 across the top of nose 166. This position of the parts is illustrated in Fig. 14. In this position finger 173 rests against a pin 176, projecting from the side of disk 164. The object of the finger 173 is to keep nose 166 down in its unlocking position until after the crankshaft handle has been turned; otherwise, nose 166 would return to its locking position immediately after the operation of any deposit key and before the crank could be turned. As shaft 13 rotates, nose 166 slips into its upward position and again locks the shaft at the end of a full revolution. Lever 167 is kept in its upward position normally by spring 177.

*The 25-cent deposit key and its connections.*—The 25-cent piece represents a value of the dime denomination which contains a fraction of the unit of that denomination. The unit of the denomination is the dime or ten cents and the 25-cent piece of course contains two and a half of such units. Whenever in a calculating device of the kind illustrated herein the means for affecting a member of that calculating device one way or the other for calculating purposes represents a value of the denomination represented by said member containing a fraction of the unit of that denomination, it is necessary to provide that the actuation of such means will not only affect its member a distance equal to the full units of value which it represents but that it shall also affect a member of the calculating device of a lower denomination to an extent representing the value of the said fraction. This is true whichever way the members of the calculating device are being affected or moved. In the machine shown in the drawings, the 25-cent piece is the only affecting means containing such a fraction, the other deposit keys and all the purchase keys representing only full units. Accordingly, the 25-cent key is so connected with the drum of the next lower denomination, that is the cents drum, that whenever the 25-cent deposit key is depressed it will move the cents drum five points in the adding direction. It is of course understood that the 25-cent key will also move its own drum, that is the dime drum, two points in the adding direction. Through these combined movements of both drums the full value of the deposit key, that is twenty-five cents, is added on the drums. Any suitable means may be employed for this purpose. The specific devices in the drawings for accomplishing this purpose are more particularly illustrated in Figs. 3, 8, and 34 to 36.

The deposit key 5ª, shown in Fig. 34, is the 25-cent deposit key, and the deposit key 5ᵇ in Fig. 36 is the 5-cent deposit key of the next lower denomination, viewed from the opposite side from that of Fig. 34, and in Fig. 35 the deposit key 5ª is the 25-cent key and the deposit key 5ᵇ is the 5-cent key. The arm 41ª connecting with the 25-cent deposit key has a projection 178 normally alined above and in engagement with a pin 179 of an arm 180 fast to a short rockshaft 181. At its other end shaft 181 has fast to it a similar short arm 182, which has a pin 183 projecting into a slot in a projection 184 from a link 185 pivoted at its upper end to a swinging piece 186 loose on shaft 16. Piece 186 is shaped exactly like the lower part of lever 15 of the deposit keys and carries at its lower end a spring-pressed dog 36 exactly like the dogs 36 of the levers 15. The swinging piece 186 however is not connected with any deposit key. Arm 185 is constructed like links 41, with the exception of projection 184 and with the exception that it is not connected with any deposit key 5. The 25-cent key however is connected with link 41ª, as already described. Arm 185 is similarly provided with a slot 42ᵇ and through it passes a stepped rod 43 of the projection 44 of sector 29 of the units order. Link 185 and its slot 42ᵇ are made to correspond exactly with link 41 and the slot 42 of deposit key 5 and stepped rod 43 passes through the two slots in exactly the same relative height. The operation of the 25-cent deposit key through the connections already described thus serves to depress the frame 30 of the units order throwing sector 29 into engagement with drum 7 of that order and moving that drum five points in the adding direction. Its effect upon the drum is precisely the same as if the 5-cent deposit key were depressed except that the corresponding money wheel is not moved upward. When the 5-cent deposit key itself is depressed, it moves its corresponding money wheel upward in the manner already described and rotates its corresponding drum 7 five points in the adding direction. When the 25-cent key is depressed, it also moves the drum 7 of the units order five points in the adding direction but does not affect the 5-cent money wheel.

It will of course be understood that the 25-cent key and its link 41, slot 42, and stepped rod 43 are all so arranged that when that key is depressed, it will move the drum 7 of the dime order two points in the adding direction. These combined operations have the effect to add twenty-five cents on the calculating device.

*Devices for preventing payment in change of any bill or coin higher in value than the deposit key depressed.*—In a mechanical cashier, it is never necessary to pay out in change any bill or coin higher in value than the deposit key of the lowest value that has been depressed. For this reason and also in order to guard against the payment of the wrong change, due to the particular form of borrowing mechanism illustrated in the accompanying drawings, I preferably provide devices controlled by each deposit key when depressed for rendering inoperative the means for paying out money of all higher denominations. Any suitable device for this purpose may be employed. Those shown in the drawings are more particularly illustrated in Figs. 2, 4, 5, 8, and 19–22, inclusive. These devices consist of the following members. 187 is a sliding piece free to slide vertically in guides 188 secured to the framework of the machine. One of these sliding pieces 187 is provided for each deposit key. Each sliding piece 187 has a hook 189 which projects over a pin 190 on double dog 21. Piece 187 has also two lateral arms 190a and 191. Arm 190a extends to the right under a pin 192 secured to the two arms of another vertically movable frame 193, as shown in Fig. 20. This frame has a cross-bar 194 at its lower end which is adapted normally to lie in front of the finger 10 of the corresponding disk 26, on drum 7. Preferably the movement imparted to frame 67 from finger 10 is imparted through bar 194. When bar 194 is lifted upward above finger 10 the latter, moving to the right as shown in Fig. 19, does not move frame 67 at all. This upward movement of bar 194 is caused by the lifting of sliding piece 187 through pin 190 of dog 21. This takes place whenever a deposit key is depressed and dog 21 is rocked. Sliding piece 187 is locked in its upward position by means of a locking piece 195 normally pressed to the right as viewed in Fig. 19 by spring 196, the shoulder 197 catching under arm 191 for that purpose. This operation prevents finger 10 of the disk corresponding to the deposit key depressed from rendering operative the turning devices for the corresponding money wheel in the direction of ejecting money. Lever 74 is not rocked and the corresponding money wheel is not turned downward so that when the ejecting devices move forward on the operation of the crank, no money is paid out from the corresponding money wheel. This inoperativeness is exteded to the money wheels of all higher denominations by means of a raised portion 198 at the right of each arm 191 and by the extension of the arm 191 toward the arm 198 of the next higher deposit key, such extension projecting under the upward projection of 198 of its arm 191, as clearly shown in Fig. 20. Each sliding piece 187 when raised, through the connections above described, also raises the sliding pieces 187 along belonging to each higher deposit key, and thus raises the bar 194 opposite the finger 10 of each higher disk on the same and all higher members of the caculating device.

Each frame 193 is returned to its normal position at the close of the operation by means of a spring 199 secured to a pin 200 fastened to the two sides of frame 193 and secured at its other end to sliding frame 67.

The locks 195 are moved back to their normal position, permitting pieces 187 to move downward by means of a shaft 201 running across the machine and provided with a pin 202 for each lock 195. Pins 202 are fast in shaft 201 and work in slots 203 in locks 195. When the locks are out of locking position, the pin 202 is at the right of the slot, as shown in Fig. 19. When the locks are moved in locking position, these pins are at the left of the slot. In order to unlock locks 195 the shaft 201 is turned to the left by means of an arm 204 fast on shaft 201 and a link 205 pivotally secured to arm 204 at one end and to arm 92 of the ejecting devices on the other. As the ejecting devices move to the left, as shown in Fig. 22, they throw locks 195 out of their locking position. On the return of the ejecting devices to their normal position shaft 201 and its pins 202 are restored to their normal position. Arm 190a of each piece 187 is made long so that if sliding frame 67 belonging to any deposit key has been moved backward through the operation of any higher deposit key, arm 190a will still be under pin 192 and the operation of the lower key will raise its corresponding frame 193, pulling up its bar 194, whereupon its sliding frame 67 will move to its forward or inoperative position.

The various parts of the machine may be restored to their normal positions after the operation of the machine by any suitable means. Some of the devices employed by me for this purpose have been already described. Those for returning the drums and the keys to their original positions will be now described. These are specially illustrated in Figs. 2, 6, 8, and 13. 206, 206 are two reciprocating rods, one on each side of the machine. They are normally held in their forward position by means of springs 207 working between a bar 208 and an upright of the machine. Bar 208 runs across the machine connecting rods 206 together and is secured to those rods. The rods are pushed into their rearward position by means of two cams 209 on main shaft 13 striking against pins 210 fast on a rearward extension of rods 206. A slot 211 in each extension permits the reciprocation of the rods. Shoulders 212 limit the forward movement of the rods. Bar 208 carries fast to it four bent arms 213 which are each provided at their upper end with a slot 214 in which works a pin 215 secured to short lever 50, the latter pivoted at 51 to frame 30, as already described. Normally lever 50 stands parallel with frame 30, thus holding subtracting bar 11 through pin 48 and groove 49 in connection with gear 12 of the drum. When rods 206 are moved to the rear, lever 50 is tilted into the position shown in Fig. 13, throwing subtracting bar 11 downward and out of engagement with gear 12. This is to permit the drums to return to their normal or zero positions. Any suitable mechanism for this purpose may be provided. I prefer for this purpose the devices shown in Figs. 17 and 18. As there shown, these devices consist of a sliding piece 216 encircling the shaft of the drum and provided with a slot 217 which works over a pin 218 fast to the shaft 7ª. Sliding piece 216 is capable of longitudinal motion along the shaft but cannot rotate on the drum. Piece 216 is normally held to the left, as shown in Fig. 17, by means of a spring 219 coiled around the shaft and lying between piece 216 and a collar 220 fast on the shaft. Fast to a projection 221 from the head of the drum and rotating with it is a roller 222 adapted to bear against the left-hand end of sliding piece 216. The bearing face of piece 216 is cam shaped and extends farther to the left as the surface nears the top until at the uppermost point it is nearer the left than at any other point. As the drum rotates, roller 222 forces sliding piece 216 to the right until it passes the highest point, when sliding piece 216 then moves to the left during the rest of the revolution of the drum until it reaches the original position shown in Fig. 17. This operation is repeated with each revolution of the drum. Whenever the drum is unlocked, as when subtracting bar 11 is thrown down through lever 50 as described above, spring 219 and sliding piece 216 force the drum back to its original position, which in the machine as shown in the drawings is the zero point. This construction has the advantage of returning the drum to its original position either way, depending upon the point that the roller has reached along the cam surface of piece 216 when the drum is released.

In order to permit the free return of the drum in both directions, I preferably throw the carrying levers 110 out of operative position so that they cannot be struck by pins 109. This is accomplished from bars 208 by means of two arms 223, one near each side of the machine, each pivoted to an arm 224. Secured to these arms is a shaft 225 which runs across the machine, as shown in Figs. 5 and 6. This shaft carries the three arms 114 which support the lower end of rods 112. The rods 206 are moved to their backward position. Arms 114 are thrown forward, carrying arms 110 out of the path of pins 109, as shown in Fig. 13. Shaft 225 also carries arms 226 which are similarly thrown forward when rods 206 are moved rearward, as shown in Fig. 13. Each rod 226 has a pin 227 which bears against the rear end of locking bar 55. The forward movement of arms 226 pushes locking bar 55 forward, releasing the operated keys and permitting them to return to their normal positions.

228 is a mistake key to enable purchase keys to be restored to their normal positions without the operation of the machine, as for example, where the wrong keys have been depressed. For this purpose I connect to the lower end of its shank 229, as shown in Fig. 8, a bellcrank lever 230 pivoted at 231, the other arm of the bellcrank lever being pivotally connected to a forward extension 232 from the rear of locking bar 55. The depression of the mistake key throws locking bar 55 forward, releasing the keys that have been operated.

*Pay out mechanism.*—It is sometimes desirable in machines of the character of that described herein to employ the machine for paying out money in cases where there is no receipt of money, as for example, in paying out money to pay bills or expenses or disbursements. In all mechanical cashiers of which I am aware this has heretofore been done through the medium of the purchase keys. As the purchase keys however are in effect subtracting keys, it is impossible to indicate the amount of money to be paid out by striking purchase keys indicating that amount without an entirely new set of connections within the machine between such purchase keys and the means for paying out money. Otherwise, the amounts paid out, if it were possible to arrange the machine to pay them out, would not represent the value of the keys struck but the difference between those values and the unit of the next higher denomination. In my improved paying out mechanism I employ the deposit keys directly; as these keys are in their effect addition keys, no change whatever is needed in the connections between them and the paying out devices except to throw out of operation the devices actuated by the deposit keys, or rendering inoperative the paying out devices corresponding to the money wheel of the deposit key and all higher money wheels, and also throwing out of operation the means for turning the money wheels upward in the direction of the upper arrow 2ª in the Fig. 8. This may be accomplished by any suitable devices. In practice, I prefer to accomplish it by means of a device which will throw out of operation the parts 17 of leaves 15 of the deposit keys. This is accomplished by turning a thumbscrew 233, see Fig. 1 and Figs. 29 to 33, inclusive. A sleeve 234 connected with thumbscrew 233 is provided with a diagonal groove 235 which works a pin 236 fast upon shaft 237. Shaft 237 is moved longitudinally and is moved to the right or left, depending upon the position of thumbscrew 233. Fast on shaft 237 are a series of pieces 238 provided with fingers passing between the body of a sliding disk 239 and a collar 240 integral therewith. Disks 239 are free to slide longitudinally on sleeve 16ª and are moved one way or the other with the movement of shaft 237. Secured to each disk 239 is a pin 241 adapted to take into a hole 242 in either part 17 and also a hole 243 in lever 15. Normally these two holes register with each other and pin 241 projects through both, disk 239 being close up against part 17, as shown in Fig. 32. When shaft 237 is moved to the right upon the turning of thumbscrew 233, each disk 239 moves to the right, withdrawing pin 241 from opening 243 in lever 15, as indicated in Fig. 31. This is the position of the parts, when it is desired to use the machine merely for paying out money as distinguished from making change between an amount deposited and an amount received. In such condition of the parts the depression of any deposit key does not move part 17 at all and therefore does not render inoperative the devices for paying money out of its corresponding money wheel and wheels of higher values. It leaves operative however the devices for turning the drums in the adding direction and the devices for moving the proper money wheels into the position to pay out money and for ejecting such money. In this operation of the machine there is performed only the process of adding upon the drums and not that of subtracting. Accordingly an amount of money will be paid out corresponding to the value of the deposit keys depressed.

In Figs. 55–61, inclusive, I have illustrated another form or embodiment of my invention in which the purchase keys are not locked down but are adapted to return to their normal position immediately after the removal of the operator's finger, and in which the connections between the deposit keys and the computing device and those between the purchase keys and the computing device are both normally out of engagement with the computing device, separate locking means being provided for holding the computing device in its set position, when not being operated by one or the other of the sets of keys and in which means are provided for throwing this locking means out of connection to permit such operation of the computing device and also permit the computing device to be returned to its original normal position. In this modification a part of the work performed by the computing device is to indicate the condition of the computation at all stages of the same.

The borrowing mechanism is slightly modified in details although acting on the same principles as in the embodiment shown in the first 54 figures of the drawings. In this modified form the operation of the purchase key by the finger of the operator positively moves the computing device in the subtracting direction and this operation is made by the time the key has completed its full cycle. Otherwise, and in all other respects the machine shown in Figs. 55–61 is like that shown in the first 54 figures of the drawings.

Of course it will be understood from the above that the work of the main shaft is reduced to turning the money receptacles in the paying-out direction, the operation of the ejecting means and the unlocking of the computing device to permit it to return to normal position, the releasing of the zero key, which is still locked down, and returning certain other parts to their normal position.

Referring to the machine shown in Figs. 55–61 in more detail, I will describe the same only in the points in which it differs from the machine shown in the other figures. The purchase keys are now constructed so that they are not locked but return at once to normal position after being operated, and they immediately and positively move the drums in the subtracting direction, and they also borrow. This is accomplished by the following mechanism. Each key has projecting from the side of its shank a pin 250, which, as the key is depressed, engages with and depresses a bar 251, which is free to move vertically on two cross rods 252 projecting from the frame gages gear 12 before teeth 279 of the sector 278 are entirely separated from the teeth of gear 12. In a similar way the deposit keys first throw the teeth of sector 29 into engagement with gear 12 and then remove lock 296 from its locking position and after the adding operation the parts are restored as in the case with the sector 278. The means employed for this purpose consist of a pin 306 mounted on frame 30 and engaging with one arm 307ª of a bellcrank lever mounted loosely on a sleeve 118, loose on shaft 119, which goes across the machine. The other arm 310 of this bellcrank lever is similarly loosely pivoted to extension 304 by means of the other end of pin 303 and slot 311 in arm 310. Pin 303, which is mounted fast in extension 304, projects from both sides of the latter as shown in Fig. 60.

The lock 296 is returned to its normal locking position in both instances by means of a spring 312 secured to a cross rod 312ª fastened to the framework of the machine and to the end of arm 313 integral with arm 298. The purchase keys are provided with return springs 52.

The purchase keys are provided with borrowing mechanism arranged on the same principles as those for the machine previously described. The details of this mechanism differ somewhat from those of the other however and will now be explained. Bar 251 of the units or lowest denomination of the machine is provided on one side with a link 314 loosely pivoted to it. This link at its lower end is pivoted to a crankarm 315 fast on a sleeve 316 loose on shaft 317 running across the machine. On its other end sleeve 316 has fast on it another crankarm 318 pivoted to a link 319. The latter at its upper end is loosely pivoted to bar 251 belonging to the next higher denomination of keys. Bar 319 is provided with two slots, an upper one 320 through which projects a pin 321 from bar 251, the lower slot 322 through which projects a pin 323 from stepbar 282 belonging to the dime denomination.

Through the above connections whenever a key of the units row is depressed, it forces down bar 251 of the next higher or dimes row of keys. This in the manner already described throws lock 296 out of locking position and throws sector 278 into engagement with gear 12. As link 319 is forced downward, the upper end of slot 322 strikes against pin 323 of stepbar 282 and forces bar 282 downward, thus moving sector 278 in the subtracting direction. Slot 322 is so proportioned that this downward movement of bar 282 will move drum 7 one point only, thus borrowing one from the next higher denomination.

By means of the arrangement of slots in link 319, the operation of a key of the higher or in this case the dime denomination does not force link 319 downward although it does carry down with it bar 251. A similar connection is provided between the dime bar 251 and the dollar bar 251 and so on through all the denominations of the machine. Of course no such connection is required for the highest denomination of keys.

To provide for the case where zero keys are struck, I provide mechanism working on the same principles as in the machine heretofore described. The details consist as follows. Each zero key 324 except the lowest and the highest is provided with a downward extension 325 of its shank which engages with a bellcrank lever 326 pivoted at 327 to the framework. At the upper end of the other arm of bellcrank lever 326 is loosely mounted a sliding bar 328 free to slide in bearings 329 of the framework. This rod carries on its rearward end a short arm 330, same carrying at its rear end a connecting pin 331. This pin is normally out of engagement with two forks 332, one projecting from link 319 and the other from link 314. When an intermediate zero key is depressed, it throws connecting pin 331 to the rear into the pockets formed by the forks, thus operatively connecting links 319 and 314. In this condition of parts the depression of a key representing a significant figure of the units row in carrying down link 319 to borrow from the dime denomination will also carry down link 314 and thus borrow from the dollar denomination. A similar device is provided for the zero key of the dollar row. If the zero keys of both the dime and dollar rows are depressed and a key representing a significant figure in the units row is then depressed, it will borrow not only from the dime and dollar denomination but also from the eagle denomination. This construction can be repeated for any number of denominations.

In order to make the above device operative, it is necessary to lock each intermediate zero key in its depressed condition until after the subtracting operation has been completed. For this purpose I provide a catch 333 adapted to take over a pin 334 on bellcrank lever 326. This catch is released at the end of the operation in a manner presently to be described.

By means of the above construction in which both the deposit keys and the purchase keys are permitted to return at once to their normal positions after being operated, and with both normally out of engagement with the drums and a separate locking device provided for the latter, it is possible to add an indefinite number of values and subtract an indefinite number of values upon the machine, the machine giving the result of the entire computation at the end work and passing through slots 253 in the ends of said bar. Bar 251 is provided with a parallel bar 254 connected to it by means of two bell cranks 255 and two links 256. The two bellcranks are mounted loosely on shafts 257 which extend across the machine. Fast on bar 251 is a downward projection 258, pivotally connected to arm 259, the latter loosely mounted on shaft 260, running all the way across the machine, by means of pin 261 projecting from 258 into the slot 262 in arm 259. Arm 259 is fast to a sleeve 263 loose on shaft 260 and carrying at its other end fast to it another arm 264. Pivoted to the free end of this latter arm is a vertical sliding piece 265 having slots 266 taking over rods 267, running all the way across the machine. Pivoted on sliding piece 265 is a dog 268 prevented from upward movement by a stop 269 on the sliding piece and held against that stop by spring 270. When the key is depressed, it forces dog 268 downward. This dog has an inclined lower surface engaging with an inclined upper surface of a sliding bar 271, sliding horizontally on rods 272, the rods passing through slots 273 in the sliding bar 271. Toward its other end sliding bar 271 is connected to a sliding support 274 which is slidingly mounted on a fixed guide 275 secured to the framework. This sliding bar 271 is connected to a vertical sliding support 274 by means of a pin 276 projecting from support 274 through an inclined slot 277 in bar 271. Support 274 carries sector 278 provided with teeth 279 adapted to mesh with gear 12 of drum 7.

When bar 271 moves to the right, as shown in Figs. 55—59 it forces support 274 upward carrying teeth 279 of sector 278 into mesh with gear 12. The purchase keys are now connected with the drums 7 all ready for the substracting operation. It is necessary to hold the teeth of sector 278 in engagement with gear 12 during the entire subtracting operation. This I secure by causing dog 268 to travel along the forward surface 280 of sliding bar 271. By the time dog 268 has reached the lower end of this surface the subtracting operation has been completed. It is now necessary to disconnect the subtracting means from the drums and this is accomplished by a further downward movement of dog 268 which, reaching the end of that surface, allows bar 271 to move backward into its original position. This is accomplished through spring 281 secured to the bar and to the standard 281ᵃ. On the return upward movement of the parts the dog 268 slips idly over the surface 280. As soon as sector 278 is thus thrown into engagement with gear 12, the subtracting operation takes place depending for its extent upon the value of the key operated. The mechanism which accomplishes this is as follows: 282 is another bar located immediately under the shanks of the purchase keys mounted so that it is free to move vertically by means of slots 283 in the bar taking over rods 284 running across the machine. Bar 282 is provided with a series of steps, as shown in Fig. 55, in order to permit keys of different values to depress the bar to different extents. Near both ends of the bar 282 there is a downward projection 285 provided with a horizontal slot 286, taking over a pin 287, projecting from an arm 288 fast on one end of a sleeve 289 loose on shaft 290, the latter running all the way across the machine. Fast on the other end of the sleeve 289 is another arm 291, which arms 291 are pivotally connected to a link 292. The above construction insures that bar 282 will move in a true vertical line in its reciprocation. Pivotally secured to the lower end of the right-hand arm 291 is a link 293, which latter is pivoted at its other end to a crank arm 294 fast on the hub 295 of sector 278. The depression of a purchase key then moves the sector 278 in the direction of the arrow in Fig. 55 for purposes of subtraction and this movement depends upon the value of the key operated as already described. In this form of machine both the subtracting sector 278 and the adding sector 29 are normally out of engagement with gear 12. In order however to positively lock drum 7 in any set position to which it may be moved I provide separate and distinct locking means. As shown, this consists of a lock 296 provided with a toothed surface to engage with some of the teeth of gear 12, when in locking position. This lock is thrown out of engagement with the gear, when either of the sectors 278 or 29 is thrown in, and I preferably arrange it so that before lock 296 is entirely disconnected from the gear, the sector which is being thrown in will go into partial engagement with the gear so that at all times the gear and drum are positively held. The particular devices shown for throwing out the lock, when sector 278 is thrown in, consists of pin 297 on bar 271, engaging with the lever 298 fast on sleeve 299, which latter is loose on shaft 300, running across the machine. Sleeve 299 also carries fast to it an arm 301 which at its upper end is loosely pivoted by means of a slot 302 in the arm 301 and a pin 303 fast on a sliding extension 304 from lock 296, the extension 304 sliding in a bearing 305 of the framework. These parts are also proportioned with the connections between bar 271 and sector 278 that before lock 296 is entirely disengaged with gear 12 the teeth 279 come into partial engagement with it. When bar 271 returns to its forward position, lock 296 is restored to its locking position and in its return movement enor at any time during the process of computation. This will be referred to more in detail farther on.

In order to return the drums to their normal position at the end of any computation the locks 296 must be removed from locking position. Any suitable means may be employed for this purpose. That shown in the drawings consists of the following: On each side of the machine is a reciprocating bar 335, provided with a slot 336 at one end taking over rod 337 running across the machine, also provided with a roller 338. Bars 335 are supported at their forward end by means of links 339, one on each side of the machine, the latter loosely pivoted on rod 300. Fast to the bars 335 and connecting them is rod 340 which passes through slots in links 339. 341 is a cam on main shaft 13. Toward the close of the operation this cam presses against roller 338 and presses bar 335 to the rear, moving rod 340. Against this rod 340 lie arms 313 and these are rocked to the rear removing locks 296 from operative position. The drums are then moved back to their normal positions in the manner already described.

Catch 333 is pulled to the rear to release its zero key by the following mechanism: Fast to each catch is a bar 342. This bar has a slot 343 through which rod 340 passes. Accordingly, whenever bar 335 is pulled to the rear, catch 333 is pulled out of locking position and the zero key returns to its original position. Bar 342 is supported upon a cross rod 344 all the way across the machine and which passes through a slot 345 in the bar 342.

The work performed by the computing device in this modified form may be of any suitable character. As shown, it ejects money from the proper money receptacles. It may also be used for other purposes, performing any other suitable work. For example, I have shown a means controlled by the computing device for indicating the results of the computation and it is so arranged that it will not only indicate the result of the entire computation but that of every step taken in the course of that computation. Any suitable means for giving this indication may be employed. That shown consists of a series of indicating wheels 346 mounted on sleeves which are loose upon shaft 347. Each indicating wheel is connected to its corresponding drum 7 by means of sprocket wheels 348 and 349 and sprocket chain 350. Each sprocket 348 and the indicating wheel are connected by a sleeve 351. These indicating wheels and their connections are shown diagrammatically in Fig. 56. Whenever a deposit key is depressed, the amount will be shown upon the indicating wheels; and if any number of deposit keys are depressed, not only the total will be shown but also the total of addition at any period in the computation, and the same is true when the subtracting wheels are operated, only in that case the indications at each time will represent the difference existing at that point of the computation.

In Fig. 62 I have represented diagrammatically one arrangement of the cams on the adding and subtracting drums and also diagrammatically the connection and operation of the deposit keys, purchase keys, and the carrying and borrowing mechanism. In this sketch the squares represent the money receptacles 2, the circles 5 represent the deposit keys, 191 represents the devices for rendering inoperative the ejecting means of the money receptacle corresponding to the value of any deposit key and all higher ones. The circles 6 represent the purchase keys. Cams 7—7 are the drums; 8—8 the cams upon drums; 109 the carrying mechanism; 29 the adding means; 11 the subtracting means; 123 the borrowing mechanism, and 149 and 154 the zero borrowing mechanism; and 181 connections between the 25-cent key of the dime denomination and the 5-cent key of the unit denomination. The arrow 353 indicates the direction in which the values proceed, when the deposit keys are struck or the machine is adding. The arrow 354 indicates the direction when the purchase keys are struck while the machine is subtracting, 10 indicates the line representing the operative point of the drum or that in the machine opposite finger 10. The numbers in this diagram are used to correspond with the corresponding parts of the mechanism shown in the machine shown in Figs. 1–54. The numeral figures 352 on the right of Fig. 62 and the dotted lines extending to the left opposite them represent the result or value of the computation, whenever the line of the cam indicated by the dotted lines stands opposite to finger 10, the number opposite the dotted line will represent the value or the result of the computation at that point on that particular drum.

For purposes of explanation I will now illustrate the operation of the machine in making a few different computations. Figs. 62–67, inclusive, represent the operation where seven dollars are received and the purchase price is six dollars. In that case the $5 deposit key is first depressed, moving drum 7 so that the number 5 on the diagram 352 will be represented as standing opposite line 10. In order to illustrate this on the diagram, I have placed the number 1 opposite the number 5 of the row 352 as indicating that that is the value of the result of the computation on the drum at the end of the first operation. Next the $2 deposit key is depressed. This will move the drum in the direction of arrow 353 two points, leaving the drum with the line representing the value 7 opposite point 10. This I indicate by the figure 2 on the drum to indicate that as the value at the end of the second operation. Then the purchase key 6 of the dollar row is depressed. This will move the drum in the direction of the arrow 354 six points. As the drum stood at the point 2 at the end of the last operation, this will move the drum to bring the value 1 of the set 352 opposite the line 10 and this position is indicated by the numeral 3 to indicate that that is the value at the end of the third operation. As this is the last operation, the computation shows that 1 represents the difference between the numbers added or subtracted, and the machine shown in the drawings will pay out one dollar. This is also illustrated in the diagram by showing a section of the cam which will cause the operation of the device for ejecting one dollar. In this and other diagrams illustrating these operations, I have shown the deposit and purchase keys that have been depressed shaded. In Figs. 64–67, inclusive, I have shown a perspective view of a drum; showing in Fig. 64, diagrammatically, the value opposite the line 10 in the normal position of the drum; in Fig. 65 the value at the end of the first operation; in Fig. 66 at the end of the second; and in Fig. 67 at the end of the third and final result of the computation, the numbers on the end of the drum being simply diagrammatically to illustrate the value or result of the computation at such stage.

Figure 68:
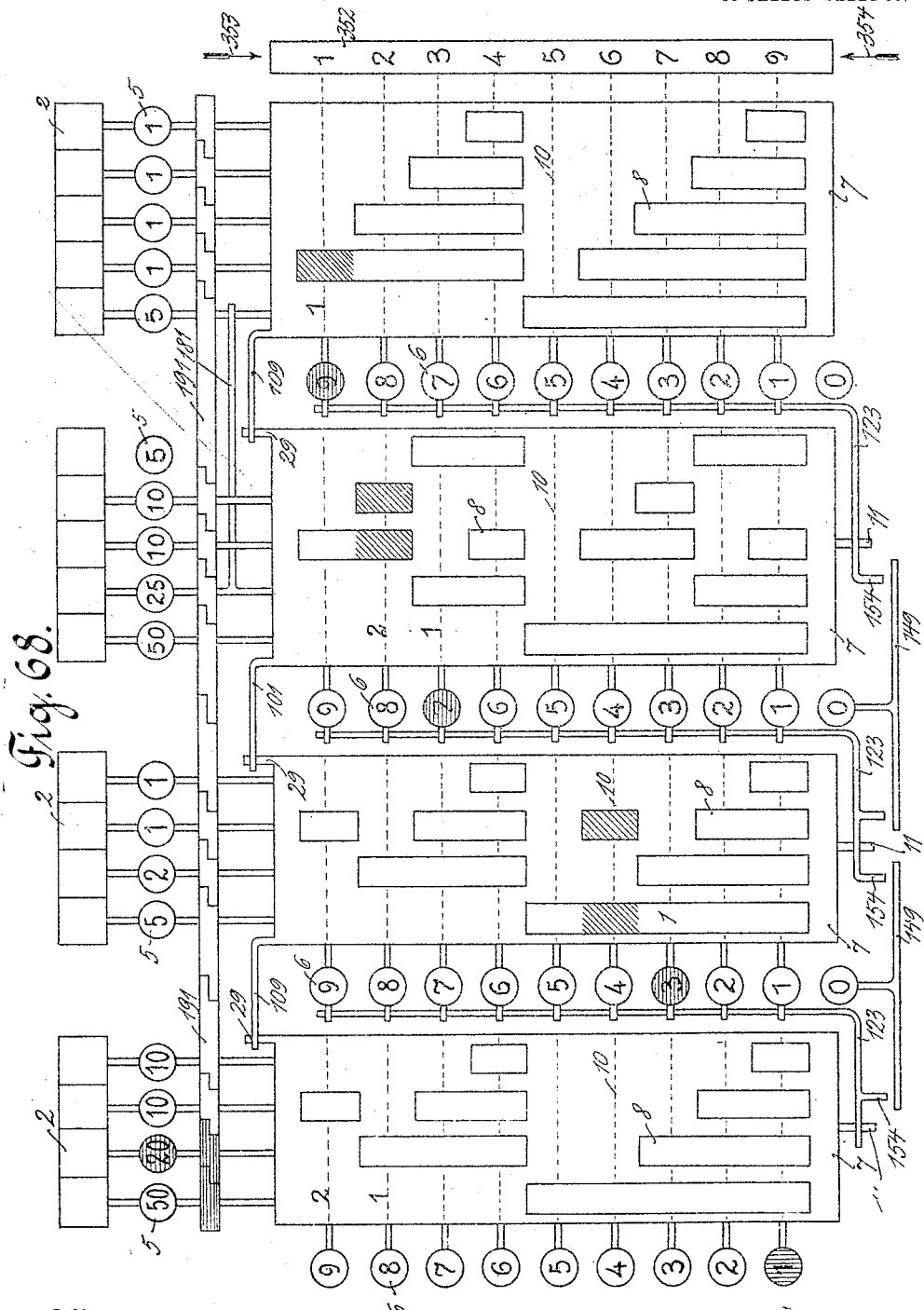

Fig. 68 illustrates the computation where twenty dollars are paid in and the purchase price is $13.79. The first operation here is the depression of the $20 deposit key. This brings on the 10 line the value represented by the number 2, and this is the result of the first operation, as represented by the number 1 on the eagle part of the diagram. The next operation is to depress the $10 purchase key. This brings the resultant value into the position marked 2. The next is to depress the $3 key. This brings the dollar drum from the zero position with the value of the computation on the line opposite figure 7 of series 352, this point being represented by the figure 1 on the dollar part of the diagram. The operation of the $3 deposit key also borrowed 1 from the higher drum-moving the resultant value on to the zero line into the position marked by the numeral 3 on the eagle part of the diagram. Next the 7 purchase key of the dime period is depressed, bringing the dime drum 7 points from the zero line or into the position marked 1 on the dime part of the diagram. This also borrows 1 from the dollar drum, moving it into the position marked 2 in that part of the diagram. Next the 9-units key is depressed, bringing the unit drum into the position marked 1 and also borrowing 1 from the dime drum, bringing that into the position marked 2. The position of the drums indicates a value of $16.21, but as the ejecting devices from and including the value of the $20 deposit key which has been operated, have been locked, the eagle drum does no work. The result is that the other three drums pay out the sums of money represented by the numbers on series 352 standing opposite the highest number that has been inserted during the operation on the various parts of the diagram. In other words, the number 2 being the highest one on the dollar drum, that standing opposite 6 on series 352, six dollars will be paid out by that drum; the highest number on the dime part of the diagram being figure 2 and that standing opposite series 2 of figure 352, that drum will pay out ten cents; and in the same way the unit drum will pay out one cent, making a total of $6.21, the correct difference between the amount received and the amount paid out. The devices 191 which are rendered inoperative are illustrated by being shaded.

Fig. 69 illustrates the operation where twenty-five cents are paid in and the purchase price is ten cents. When the 25-cent deposit key is depressed, it moves the dime drum so that the resultant value is opposite the 2 line of series 352, and this is similarly illustrated by marking the number 1 on the dime part of the diagram. The 25-cent key also through connection 181 moves the unit drum five points in the adding direction, bringing that drum into the position marked 1 on that part of the diagram. Next the 10-cent purchase key is depressed. This moves the dime drum so that the result in values is represented by the figure 2. This operation also borrows from the next higher drum but as that has been rendered inoperative by the depression of the 25 key, it will not be considered. The result of this computation is that ten cents are paid out by the dime drum and five cents by the unit drum, giving the correct difference between twenty-five cents received and the ten cents paid out.

Fig. 70 represents the operation where seventy-five cents are paid in and the purchase price is sixty-eight cents. Seventy-five cents are paid in through a fifty-cent piece and a twenty-five cent piece. The 50-cent deposit key, when depressed moves the drum into the position marked 1 on the diagram. The 25-cent key moves the dime drum two points in the adding direction, bringing it into the position marked 2. It also moves the unit drum five points in the adding direction, bringing it into the position illustrated by the number 1 on that part of the diagram. When the 6 purchase key in the dimes row is depressed, it moves the drum six points in the subtracting direction, bringing it into the position illustrated by the figure 3. When the 8-cent key is depressed, it moves the unit drum eight points in the subtracting direction, bringing it into the position illustrated by figure 2 on that part of the diagram. This movement carried the drum opposite the borrowing point and accordingly 1 was borrowed from the dime drum, bringing that drum into the position illustrated by figure 4. The dime drum standing with 0 opposite the line 10, pays out nothing; but the unit drum pays out seven cents, the correct difference between the amount received, seventy-five cents, and the purchase price, sixty-eight cents.

Fig. 71 illustrates diagrammatically the various operations where a number of amounts are received and there are a number of purchase prices, showing the embodiment of the method of operation of the machine shown in Figs. 55-61. The various numbers on the different drums indicate the position of the drums at the end of the different operations.

In Fig. 72 I have shown a diagrammatic view illustrating the application of my device to a machine for computing abstract numbers alone. In this case the deposit keys consist of a number representing each integer from naught to 9, inclusive, for each denomination. The operation is precisely the same as that already described. The cams employed for this purpose are shown in the diagram.

What I claim as new and desire to secure by Letters Patent is:

1. The combination of a device for adding and subtracting composed of members, one member for each denomination of values, means for each member of said device for affecting said member one way for adding purposes, and means for each member for affecting it the reverse way for purposes of subtraction, and borrowing means connected with the subtraction affecting means of a member and adapted to be actuated, before such affecting means begins its subtracting operation, to move the member of the next higher denomination one step in the subtracting direction, whereby the resultant condition of the members of said adding and subtracting device will represent the difference between the amounts added or subtracted.

2. The combination of a device for adding and subtracting, means for affecting said device one way for adding purposes, means for affecting said device the reverse way for purposes of subtraction, one of said means being normally connected with the adding and subtracting device and the other normally out of connection, a device for throwing one out and the other in, and vice versa, whereby during the regular operation of the machine the adding and subtracting device may at one time be affected one way for adding purposes and at another time the reverse way for purposes of subtraction and will at all such times be positively held and affected, and means for throwing both out of connection to permit the adding and subtracting device to return to its normal position.

3. In a mechanical cashier, the combination of a device for adding and subtracting, means for affecting said device one way for adding purposes, means for affecting said device the reverse way for purposes of subtraction, one of said means being normally connected with the adding and subtracting device and the other normally out of connection, a device for throwing one out and the other in, and vice versa, whereby during the regular operation of the machine the adding and subtracting device may at one time be affected one way for adding purposes and at another time the reverse way for purposes of subtraction and will at all such times be positively held and affected, means for throwing both out of connection to permit the adding and subtracting device to return to its normal position, a series of money receptacles, and ejecting devices adapted to be actuated by the resultant condition of the members of the adding and subtracting device.

4. In a mechanical cashier, the combination of a device for adding and subtracting, deposit keys for affecting said device one way for adding purposes, purchase keys for affecting said device the reverse way for purposes of subtraction, said purchase keys being normally connected with the adding and subtracting device and the deposit keys being normally out of connection with such device, a device for throwing the purchase keys out of connection with said device and for throwing the deposit keys into connection, and vice versa, whereby during the regular operation of the machine the adding and subtracting device may at one time be affected one way for adding purposes and at another time the reverse way for purposes of subtraction and will at all such times be positively held and affected, means for throwing both the deposit keys and the purchase keys out of connection to permit the adding and subtracting device to return to its normal position, and means for returning it to such position.

5. In a mechanical cashier, the combination of a device for adding and subtracting, deposit keys for moving said device one way for adding purposes, purchase keys for moving said device the reverse way for purposes of subtraction, connections between the deposit keys and the adding and subtracting device and connections between the purchase keys and the said device, a supporting means common to both sets of connections adapted normally to hold one of the said sets of connections in engagement with the adding and subtracting device and to hold the other out of engagement, and means for moving said supporting device so as to throw one of the said sets of connections into engagement with the adding and subtracting device and to throw the other out of engagement, and vice versa, whereby during the regular operation of the machine the adding and subtracting device may at one time be affected one way for adding purposes and at another time the reverse way for purposes of subtraction and will at all such times be positively held and affected.

6. The combination of a device for adding and subtracting composed of members, one member for each denomination of values, means for each member of said device for affecting said member one way for adding purposes, means for each member for affecting it the reverse way for purposes of subtraction, carrying devices for carrying one from each lower member to the next higher member when the former has moved a full complement, borrowing means for borrowing one from a higher member when that becomes necessary, whereby the resultant condition of the members of said adding and subtracting device will represent the difference between the amounts added or subtracted, and means for throwing the carrying mechanism entirely out of operation.

7. The combination of a device for adding and subtracting composed of members, one member for each denomination of values, means for each member of said device for affecting said member one way for adding purposes, means for each member for affecting it the reverse way for purposes of subtraction, carrying devices for carrying one from each lower member to the next higher member when the former has moved a full complement, and borrowing devices adapted to be actuated whenever a number device of any denomination is operated to borrow one from the member of the subtracting device of the next higher denomination, the carrying and borrowing devices being normally in operative position simultaneously with each other during the ordinary operation of the machine without interfering one with the other, whereby the resultant condition of the members of said adding and subtracting device will represent the difference between the amounts added or subtracted.

8. In a mechanical cashier, the combination of an adding and subtracting device composed of members, one member for each denomination of values, deposit keys corresponding to each member of said device for moving said members one way for adding purposes, purchase keys corresponding to each member of said device for moving the device the reverse way for purposes of subtraction, carrying devices for carrying one from each lower member to the next higher member, when the former has moved a full complement, borrowing devices adapted to be actuated by the deposit keys, whenever operated, to borrow one from the member of the adding and subtracting device of the next higher denomination, and money receptacles and ejecting devices adapted to be controlled by the resultant condition of the members of said adding and subtracting device to eject an amount of money corresponding to such resultant condition.

9. In a mechanical cashier, the combination of an adding and subtracting device, a set of number devices for adding purposes, a set of number devices for subtracting purposes, connections between each set of number devices and the adding and subtracting device for operating the latter in accordance with the values of the number devices operated, money receptacles for the reception of money of different values, detachable connections between the adding number devices and the money receptacles to turn the latter one way, devices for connecting or disconnecting such detachable connections, and means controlled by the adding and subtracting device for turning the money receptacles the reverse way to permit money to be discharged from the appropriate receptacles, whereby in one operation of the machine the adding and subtracting device will indicate amounts received and the machine will pay out the difference between such amount and the amount of purchase and in another operation of the machine the adding number devices, used alone without the subtracting number devices, will cause amounts to be paid out in accordance with the value of such adding number devices operated.

10. In a machine of the class described, the combination with a selecting mechanism and denominational purchase devices including value number devices and a zero number device, of borrowing mechanism between the elements of said selecting device, and connecting devices adapted to be moved into operative position by the zero number device of any denomination to connect the borrowing mechanism actuated by the value number devices of the next lower denomination with the borrowing mechanism adapted to borrow from the next higher denomination.

11. In a machine of the class described, the combination with a plurality of rotary cash receptacles, of a plurality of change selecting devices, means for moving said selecting devices in opposite directions, cams driven by said selecting devices and connections whereby said cams control movement of said rotary receptacles.

12. In a machine of the class described, the combination with a plurality of rotary money receptacles, of a plurality of change selecting devices, keys for moving said selecting devices in an adding direction, means for reversely moving said selecting devices in a subtracting direction, cams connected to said selecting devices, connections controlled by said cams for moving said money receptacles and devices actuated by each adding key for preventing movement of the rotary receptacles of all higher values.

13. In a machine of the class described, the combination with a plurality of rotary money receptacles, of a plurality of change selecting devices, controlling keys moving said selecting devices in an adding direction, purchase keys controlling movement of said selecting devices in a subtracting direction, a plurality of disks movable with each selecting device and connections whereby each disk controls the movement of the corresponding money receptacle.

14. In a machine of the class described, the combination with a plurality of rotary cash receptacles, of a series of change selecting devices, controlling keys having connections for causing movements of addition of said selecting devices, banks of purchase keys and connections whereby said keys control subtracting movements of said selecting devices, a plurality of cam disks movable with each selecting device and connections whereby each cam disk controls movement of the corresponding money receptacle.

15. In a machine of the class described, the combination with a plurality of rotary money receptacles, of a series of rotary change selecting devices, controlling keys having connections to add amounts on said selecting devices, banks of purchase keys having connections to subtract amounts from said selecting devices, a plurality of cam disks movable with each selecting device, connections whereby each cam disk controls movement of the corresponding money receptacle and means controlled by each adding key for preventing operation of the money receptacles of higher values than the key.

16. In a machine of the class described, the combination with a plurality of deposit keys and change selectors controlled thereby, of coin receptacles, devices controlled by the change selector for permitting the ejection of coins from said receptacle, a main operating device, and connections from said main operating device to said ejector controlling devices constructed to prevent the controlling device corresponding to any deposit key from being operated.

17. In a machine of the class described, the combination with a plurality of deposit keys and change selectors operated thereby, of coin holding receptacles, devices controlled by said selecting devices for permitting ejection of coin from said receptacles, a main operating device having connections to operate said ejector controlling devices, and means controlled by each deposit key for disabling said connections from said coin operating mechanism whereby the ejection of coin from the receptacle corresponding to any operated deposit key and all deposit keys of higher value is prevented.

18. In a machine of the class described, the combination with a plurality of rotary money receptacles, of a plurality of cam disks, controlling keys operating said cam disks in an adding direction, connections from said cam disks whereby said money receptacles are moved and including a displaceable bar, and connections from said controlling keys for disengaging said bar and thereby preventing operations of said money receptacles.

19. In a machine of the class described, the combination with a plurality of rotary cash receptacles and a plurality of change electing devices, of means for moving said selecting devices in an adding direction, connections whereby said selecting devices control the movement of said rotary receptacles, means for withdrawing an element of said connections and thereby disabling said moving connections and means for locking said withdrawn element in its withdrawn position.

20. In a machine of the class described, the combination with a plurality of rotary change selecting devices, of a series of banks of purchase keys, connections from said purchase keys for subtracting amounts on said selecting devices and transfer mechanism directly actuated by said keys and serving to cause an extra subtracting movement of the change selecting device next higher in value than the operated key.

21. In a machine of the class described, the combination with a plurality of change selecting devices and a series of banks of purchase keys, of connections whereby said keys control the subtraction of amounts on said selecting devices, a bar actuated by the keys of each bank except the highest and connections whereby movement of any of said bars causes an extra subtracting movement of the change selecting device of next higher order.

22. In a machine of the class described, the combination with a plurality of rotary change selecting devices, of a set of rack bars constructed to subtract amounts from said selecting devices and normally in engagement therewith, a set of segment racks constructed to cause adding movements of said selecting devices and normally disengaged therefrom, controlling keys serving to engage said segment racks with said selecting devices and to disengage said subtracting rack bars therefrom, and additional devices for withdrawing said subtracting rack bars whereby said selecting devices may be reset.

23. In a machine of the class described, the combination with a plurality of rotary change selectors and transfer mechanism between said selectors, means for locking said selectors in adjusting position, spring devices for resetting said selecting devices, and a common mechanism constructed to disable said selecting device locking means and to disable said transfer devices.

24. In a machine of the class described, the combination with a plurality of rotary change selectors and transfer mechanism between said selectors, of a plurality of banks of purchase keys constructed to subtract amounts from said selectors, means for latching said keys in depressed positions and a common device having connections to reset said selecting devices to normal position, to disable said transfer mechanism, and to release said purchase keys.

25. In a machine of the class described, the combination with a rotary selecting device, of a segment rack for operating the same and normally disengaged therefrom, and a controlling key having connections first to move said segment rack bodily into mesh with said selecting device and then to move it differentially.

26. In a machine of the class described, the combination with a rotary selecting device, of a segment rack constructed to actuate said selecting device and normally disengaged therefrom, a frame on which said segment rack is carried, an operating key, and connections from said key to move said frame whereby to cause engagement of said segment rack and said selecting device, and additional connections whereby to cause differential movement of said segment rack.

27. In a machine of the class described, the combination with a rotary change selecting device and a rod on which said selecting device is carried, of a cylindrical cam engaged by an element of said selecting device and a spring for moving said cam whereby to reset said selecting device in either direction to its normal zero position.

28. In a machine of the class described, the combination with a plurality of cash receptacles and change selectors controlling said receptacles, of deposit keys determining the extent of movement of said selectors, devices normally operated by said controlling keys for moving said rotary receptacles in a direction opposite to their movement under control of said selecting devices, and a hand operated element having connections to disengage said connections, whereby the rotary receptacles will not be moved by said deposit keys.

29. In a machine of the class described, the combination with a plurality of rotary money receptacles, of a plurality of change selecting devices, deposit keys actuating said change selecting devices in an adding direction, arms normally connected to said deposit keys serving to actuate said money receptacles, connections from said selecting devices for actuating said receptacles in a direction opposite to their movement under control of the deposit keys, and a hand operated element constructed to disable said connections, whereby operation of said deposit keys will not cause adjustment of said money receptacles.

30. In a machine of the class described, the combination with a plurality of denominational change selecting devices, of a plurality of deposit keys having connections to actuate said devices differentially, a 25¢ deposit key, and connections including a bar moved by said key and an arm driven by said bar and connected to the 5¢ deposit key.

31. In a machine of the class described, the combination with a plurality of rotary change selecting devices, of a series of banks of purchase keys, devices for subtracting amounts from said change selecting devices under control of said banks of purchase keys, and transfer mechanism whereby operation of a key of any bank serves to cause an extra subtracting movement of the change selector of next higher denomination, a zero key in each bank of purchase keys and connections whereby each zero key connects for operation the subtracting transfer mechanism of the next higher bank of purchase keys.

32. In a machine of the class described, the combination with change selecting devices, of a plurality of change holding receptacles, a series of levers for operating said receptacles, a plurality of frames controlled by said selecting devices, and a main operating mechanism having connections to operate said levers whereby to move said change receptacles.

33. In a machine of the class described, the combination with a plurality of change selectors, and a corresponding number of change holding receptacles, of a series of levers for operating said receptacles, a series of frames controlled by said change selectors and having devices for actuating said levers, and a main operating device having connections to move said frame devices when the same has been positioned by the change selectors.

34. In a machine of the class described, the combination with a plurality of change selectors and a corresponding number of change holding receptacles, of a series of levers for operating said receptacles, a plurality of devices comprising plungers adapted to be moved by said change selectors, a main operating shaft, and connections from said shaft to move said plungers when the same have been adjusted by said selecting device.

35. In a machine of the class described, the combination with a plurality of controlling deposit keys, of a corresponding number of change selectors, a series of coin holding devices adapted to be moved by said deposit keys and a hand operated device disabling the connection between said deposit keys and said receptacles.

36. In a machine of the class described, the combination with a plurality of deposit keys and a corresponding series of change selectors controlled thereby, of a plurality of coin receptacles adapted to be operated by said deposit keys, a plurality of change selectors operated by said deposit keys and also adapted to adjust the coin receptacles, and a hand operated device having connections to prevent movement of the coin receptacles by the deposit keys while permitting the adjustment of said selecting devices by said keys.

In testimony whereof, I have signed my name to this specification, in the presence of two subscribing witnesses.

ALAN D. KENYON.

Witnesses:
GEO. W. MILLS, Jr.,
EDWIN SEGER.